(12) United States Patent
Holmes

(10) Patent No.: US 12,377,522 B2
(45) Date of Patent: Aug. 5, 2025

(54) ELONGATE ABRASIVE ARTICLE WITH ORIENTATIONALLY ALIGNED FORMED ABRASIVE PARTICLES

(71) Applicant: 3M INNOVATIVE PROPERTIES COMPANY, St. Paul, MN (US)

(72) Inventor: Dean S. Holmes, Ellsworth, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 535 days.

(21) Appl. No.: 17/309,097

(22) PCT Filed: Oct. 14, 2019

(86) PCT No.: PCT/IB2019/058741
§ 371 (c)(1),
(2) Date: Apr. 23, 2021

(87) PCT Pub. No.: WO2020/084382
PCT Pub. Date: Apr. 30, 2020

(65) Prior Publication Data
US 2022/0016745 A1 Jan. 20, 2022

Related U.S. Application Data

(60) Provisional application No. 62/750,639, filed on Oct. 25, 2018.

(51) Int. Cl.
*B24D 11/00* (2006.01)
*B24D 13/10* (2006.01)
(Continued)

(52) U.S. Cl.
CPC ............ *B24D 11/00* (2013.01); *B24D 11/001* (2013.01); *C09K 3/1436* (2013.01); *B24D 13/10* (2013.01); *B24D 13/145* (2013.01)

(58) Field of Classification Search
CPC ...... B24D 11/00; B24D 11/001; B24D 13/10; B24D 13/145; C09K 3/1436
See application file for complete search history.

(56) References Cited

U.S. PATENT DOCUMENTS 3,233,272 A 2/1966 Pambello
3,270,467 A 9/1966 Block
(Continued)

FOREIGN PATENT DOCUMENTS

JP H0593336 4/1993
WO WO 2012-112305 8/2012
(Continued)

OTHER PUBLICATIONS

Merriam Webster's Collegiate Dictionary 10th Edition, definition of the term 'normal', p. 792 (Year: 1997).*
(Continued)

*Primary Examiner* — Pegah Parvini
(74) *Attorney, Agent, or Firm* — Kathleen B. Gross; Aleksander Medved; Katherine M. Scholz

(57) ABSTRACT

Abrasive articles are disclosed comprising at least one primary elongate abrasive element extending along an element axis. The primary elongate abrasive element comprises a plurality of formed abrasive particles, wherein at least 50% of the formed abrasive particles are orientationally aligned along the element axis.

20 Claims, 13 Drawing Sheets

(51) Int. Cl.
  *B24D 13/14* (2006.01)
  *C09K 3/14* (2006.01)

(56) References Cited

U.S. PATENT DOCUMENTS

| | | | |
|---|---|---|---|
| 3,562,968 | A | 2/1971 | Johnson |
| 3,618,154 | A | 11/1971 | Muhler |
| 3,667,170 | A | 6/1972 | Mackay, Jr. |
| 4,875,259 | A | 10/1989 | Appeldron |
| 5,045,091 | A | 9/1991 | Abrahamson |
| 5,077,870 | A | 1/1992 | Melbye |
| 5,201,916 | A | 4/1993 | Berg |
| 5,213,591 | A | 5/1993 | Celikkaya |
| 5,233,719 | A | 8/1993 | Young |
| 5,366,523 | A | 11/1994 | Rowenhorst |
| 5,400,458 | A | 3/1995 | Rambosek |
| 5,427,595 | A | 6/1995 | Pihl |
| 5,460,883 | A | 10/1995 | Barber, Jr. |
| 5,584,897 | A * | 12/1996 | Christianson .......... B24D 11/02 156/137 |
| 5,679,067 | A | 10/1997 | Johnson |
| 5,903,951 | A | 5/1999 | Ionta |
| 6,352,471 | B1 | 3/2002 | Bange |
| 8,034,137 | B2 | 10/2011 | Erickson |
| 8,142,531 | B2 | 3/2012 | Adefris |
| 8,728,185 | B2 | 5/2014 | Adefris |
| 2015/0290773 | A1 * | 10/2015 | Banuelos ............. B24D 11/001 51/307 |
| 2016/0289520 | A1 | 10/2016 | Bujnowski |

FOREIGN PATENT DOCUMENTS

| | | | |
|---|---|---|---|
| WO | WO 2018-057465 | 3/2018 | |
| WO | WO 2018-080779 | 5/2018 | |
| WO | WO-2018080778 A1 * | 5/2018 | ............. B24D 11/00 |
| WO | WO 2019-215571 | 11/2019 | |

OTHER PUBLICATIONS

Legge, "Thermoplastic Elastomers, a Comprehensive Review", Hanser Publishers, 1987, Table of Contents, 5pages.
International Search report for PCT International Application No. PCT/IB2019/058741 mailed on Jan. 22, 2020, 5 pages.

* cited by examiner

ELONGATE ABRASIVE ARTICLE WITH ORIENTATIONALLY ALIGNED FORMED ABRASIVE PARTICLES

CROSS REFERENCE TO RELATED APPLICATIONS

This application is a national stage filing under 35 U.S.C. 371 of PCT/IB2019/058741, filed Oct. 14, 2019, which claims the benefit of U.S. Provisional Application No. 62/750,639, filed Oct. 25, 2018, the disclosure of which is incorporated by reference in its/their entirety herein.

BACKGROUND

Abrasive bristle discs and brushes are generally known for use in various cleaning, finishing, and deburring applications. There is a need for improved abrasive bristle discs and brushes, and for other abrasive articles comprising elongate abrasive members such as bristles.

SUMMARY OF THE INVENTION

Brushes have been used to polish, clean, and abrade a wide variety of substrates. These brush products typically have a plurality of bristles that contact the substrate. Abrasive particles can be added to bristles to increase their abrasiveness. There are many manufacturing steps necessary to manufacture a conventional abrasive brush having bristles which contain abrasive particles. A mixture of abrasive particles and a thermoplastic binder may be combined and then extruded to form a bristle. The bristle is then cut to the desired length. A plurality of these bristles are then mechanically combined to form a article. Next, a plurality of these articles may be installed on a hub or plate to form a brush.

Examples of products having abrasive bristles include SCOTCH-BRITE™ Bristle Discs and Brushes (available from 3M Company, St. Paul, MN), which are available in various sizes and configurations for a variety of abrasive applications. Other configurations of abrasives brushes, bristle, and/or filaments are described in, for example, U.S. Pat. No. 5,045,091 (Abrahamson et al.); U.S. Pat. No. 5,233,719 (Young et al.); U.S. Pat. No. 5,400,458 (Rambosek); U.S. Pat. Nos. 5,679,067 and 5,903,951 (Ionta et al.); U.S. Pat. No. 5,427,595 (Pihl et al.); U.S. Pat. No. 5,460,883 (Barber et al.); U.S. Pat. No. 3,618,154 (Muhler et al.); and U.S. Pat. No. 3,233,272 (Pambello).

Abrasive particles generally include crushed abrasive grain, formed abrasive particles, and/or precisely formed abrasive particles. Examples of basic formed abrasive particles are described in U.S. Pat. No. 5,201,916 (Berg et al.) and U.S. Pat. No. 5,366,523 (Rowenhorst et al.), where it is generally disclosed that such particles could be used in abrasive brushes. Examples of precisely formed abrasive particles include CUBITRON II™ (available from 3M Company, St. Paul, MN). Examples of precisely formed abrasive particles are also described in U.S. Pat. No. 8,142,531 (Adefris et al.); U.S. Pat. No. 8,728,185 (Adefris), where it is generally disclosed that such particles could be used in abrasive brushes. Other useful formed abrasive particles are disclosed in U.S. Provisional Application No. 62/669,568 to Mevissen et al. ("Abrasive Articles Including Soft Shaped Abrasive Particles"), the disclosure of which is incorporated herein by reference.

It has been discovered that, by orienting formed abrasive particles in a controlled manner along an axis of an elongate abrasive element (e.g., a bristle), unexpected improvements in abrasive performance can be realized.

Exemplary embodiments according to the present disclosure include, but are not limited to, the embodiments listed below, which may or may not be numbered for convenience. Several additional embodiments, not specifically enumerated in this section, are disclosed within the accompanying detailed description.

Embodiment 1. An abrasive article comprising at least one primary elongate abrasive element extending along an element axis, the primary elongate abrasive element comprising a plurality of formed abrasive particles, wherein at least 50% of the formed abrasive particles are orientationally aligned along the element axis.

Embodiment 2. The abrasive article of Embodiment 1 wherein the plurality of formed abrasive particles each comprise
  a maximum dimension M;
  a thickness T measured normally to the maximum dimension M;
  a particle axis defined along the maximum dimension M; and
  a particle plane containing the particle axis and defined normally to the thickness T;
  wherein the formed abrasive particles that are orientationally aligned are generally orientationally aligned such that particle plane is oriented within 60 degrees of parallel to the element axis.

Embodiment 3. The abrasive article of Embodiment 2 wherein one of: at least 66%, at least 75%, at least 90%, at least 95%, or at least 96% of the formed abrasive particles are generally orientationally aligned.

Embodiment 4. The abrasive article of any of Embodiments 2 or 3 wherein at least a portion of the formed abrasive particles that are orientationally aligned are precisely orientationally aligned such that particle plane is oriented within 15 degrees of parallel to the element axis.

Embodiment 5. The abrasive article of Embodiment 4 wherein at least 50% of the formed abrasive particles are precisely orientationally aligned.

Embodiment 6. The abrasive article of Embodiment 5 wherein at least 66% of the formed abrasive particles are precisely orientationally aligned.

Embodiment 7. The abrasive article of Embodiment 1 wherein the plurality of formed abrasive particles each comprise
  a maximum dimension M;
  a thickness T measured normally to the maximum dimension M;
  a particle axis defined along the maximum dimension M; and
  a particle plane containing the particle axis and defined normally to the thickness T;
  wherein the formed abrasive particles that are orientationally aligned are precisely orientationally aligned such that particle plane is oriented within 15 degrees of parallel to the element axis.

Embodiment 8. The abrasive article of Embodiment 7 wherein at least 66% of the formed abrasive particles are precisely orientationally aligned.

Embodiment 9. The abrasive article of any of Embodiments 2-8 wherein the orientationally aligned formed abrasive particles comprise first and second major faces separated by the thickness T, wherein the particle axis is defined along one of the first face or the second face, and the particle plane is substantially parallel to the first and second major faces.

Embodiment 10. The abrasive article of Embodiment 9 wherein the orientationally aligned formed abrasive particles comprise triangular particles, wherein the first and second major faces are triangular.

Embodiment 11. The abrasive article of any of Embodiments 2-8 wherein the orientationally aligned formed abrasive particles comprise rod-shaped particles, wherein a rod axis is defined along the particle axis.

Embodiment 12. The abrasive article of any of Embodiments 2-11 wherein a ratio R of the maximum dimension M to the thickness T of the orientationally aligned formed abrasive particles is 3 or greater.

Embodiment 13. The abrasive article of any of Embodiments 1-12 comprising a branch elongate abrasive element extending from the primary elongate abrasive element.

Embodiment 14. The abrasive article of any of Embodiments 1-13 wherein the first elongate abrasive element extends from a base.

Embodiment 15. The abrasive article of Embodiment 14 comprising a plurality of primary elongate abrasive elements extending from the base.

Embodiment 16. The abrasive article of Embodiment 15 wherein the base comprises a hub comprising a hub axis.

Embodiment 17. The abrasive article of Embodiment 16 wherein the plurality of primary elongate abrasive elements extend radially from the hub.

Embodiment 18. The abrasive article of Embodiment 16 wherein the plurality of primary elongate abrasive elements extend axially from the hub generally parallel to the hub axis.

Embodiment 19. The abrasive article of Embodiment 16 wherein a portion of the plurality of primary elongate abrasive elements extend axially from the hub generally parallel to the hub axis, and a portion of the plurality of primary elongate abrasive elements extend radially from the hub.

Embodiment 20. The abrasive article of Embodiment 16 wherein a portion of the plurality of primary elongate abrasive elements extend both radially and axially from the hub.

Embodiment 21. The abrasive article of any of Embodiments 15-20, wherein the abrasive article comprises a brush, wherein the plurality of elongate abrasive elements are bristles of the brush.

Embodiment 22. The abrasive article of any of Embodiments 16-20, wherein the abrasive article comprises a rotary brush, wherein the plurality of elongate abrasive elements are bristles of the rotary brush.

Embodiment 23. The abrasive article of any of Embodiments 1-22 wherein each primary elongate abrasive element comprises a binder retaining the formed abrasive particles.

Embodiment 24. The abrasive article of Embodiment 23 wherein each primary elongate abrasive elements is formed by flowing a mixture of the binder and the formed abrasive particles along the element axis.

Embodiment 25. A method of forming an elongate abrasive element, the elongate abrasive element comprising a binder and a plurality of formed abrasive particles, the method comprising
flowing a mixture of the binder and the plurality of formed abrasive particles along a flow axis such that at least 50% of the plurality of shape abrasive particles orientationally align along the flow axis;
allowing the mixture to set, thereby forming the elongate abrasive element comprising an element axis, wherein at least 50% of the plurality of formed abrasive particles are orientationally aligned along the element axis.

Embodiment 26. The method of Embodiment 25 wherein each of the orientationally aligned formed abrasive particles comprise
a maximum dimension M;
a thickness T measured normally to the maximum dimension M;
a particle axis defined along the maximum dimension M; and
a particle plane containing the particle axis and defined normally to the thickness T;
wherein orientationally aligning the formed abrasive particles results in generally orientationally aligning the formed abrasive particles such that the particle plane is oriented within 60 degrees of parallel to the element axis.

Embodiment 27. The method of Embodiment 26 wherein one of: at least 66%, at least 75%, at least 90%, at least 95%, or at least 96% of the formed abrasive particles are generally orientationally aligned.

Embodiment 28. The method of any of Embodiments 26 or 27 wherein at least a portion of the formed abrasive particles that are orientationally aligned are precisely orientationally aligned such that particle plane is oriented within 15 degrees of parallel to the element axis.

Embodiment 29. The method of Embodiment 28 wherein at least 50% of the formed abrasive particles are precisely orientationally aligned.

Embodiment 30. The method of Embodiment 29 wherein at least 66% of the formed abrasive particles are precisely orientationally aligned.

Embodiment 31. The method of Embodiment 25 wherein the plurality of formed abrasive particles each comprise
a maximum dimension M;
a thickness T measured normally to the maximum dimension M;
a particle axis defined along the maximum dimension M; and
a particle plane containing the particle axis and defined normally to the thickness T;
wherein the formed abrasive particles that are orientationally aligned are precisely orientationally aligned such that particle plane is oriented within 15 degrees of parallel to the element axis.

Embodiment 32. The method of Embodiment 31 wherein at least 66% of the formed abrasive particles are precisely orientationally aligned.

Embodiment 33. The method of any of Embodiments 26-32 wherein the orientationally aligned formed abrasive particles comprise first and second major faces separated by the thickness T, wherein the particle axis is defined along one of the first face or the second face, and the particle plane is substantially parallel to the first and second major faces.

Embodiment 34. The method of any of Embodiments 25-33 wherein flowing the mixture comprises injection molding the mixture into a mold cavity comprising a shape corresponding to the elongate abrasive element.

Embodiment 35. The method of any of Embodiments 25-33 wherein flowing the mixture comprises extruding the mixture from a die opening.

Embodiment 36. The method of any of Embodiments 25-35 wherein prior to flowing the mixture, the binder is heated to a molten state, and wherein allowing the mixture to set comprises cooling the binder until it reaches a solidified state to retain the plurality of formed abrasive particles.

The words "preferred" and "preferably" refer to embodiments described herein that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the terms "comprises" and variations thereof do not have a limiting meaning where these terms appear in the accompanying description. Moreover, "a," "an," "the," "at least one," and "one or more" are used interchangeably herein.

Relative terms such as left, right, forward, rearward, top, bottom, side, upper, lower, horizontal, vertical, and the like may be used herein and, if so, are from the perspective observed in the particular figure. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

The above summary is not intended to describe each embodiment or every implementation of the invention described herein. Rather, a more complete understanding of the invention will become apparent and appreciated by reference to the following description and claims in view of the accompanying figures of the drawing.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

Abrasive Articles

Abrasive articles 10 and abrasive assemblies according to the present disclosure may take the form of bristle brushes (rotary or otherwise) or discs, or components of brushes or discs, as described herein.

Figure 11:
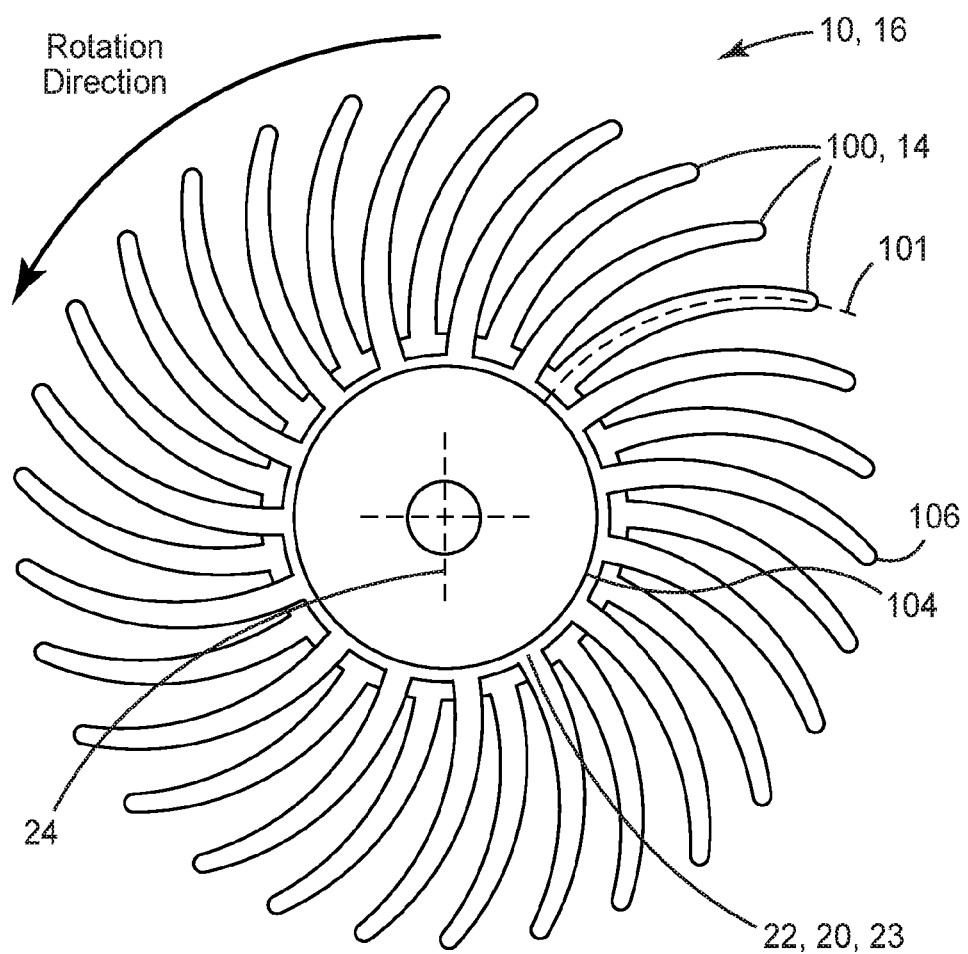
FIGS. 11-13 depict exemplary abrasive articles comprising elongate abrasive elements.
Figure 12:
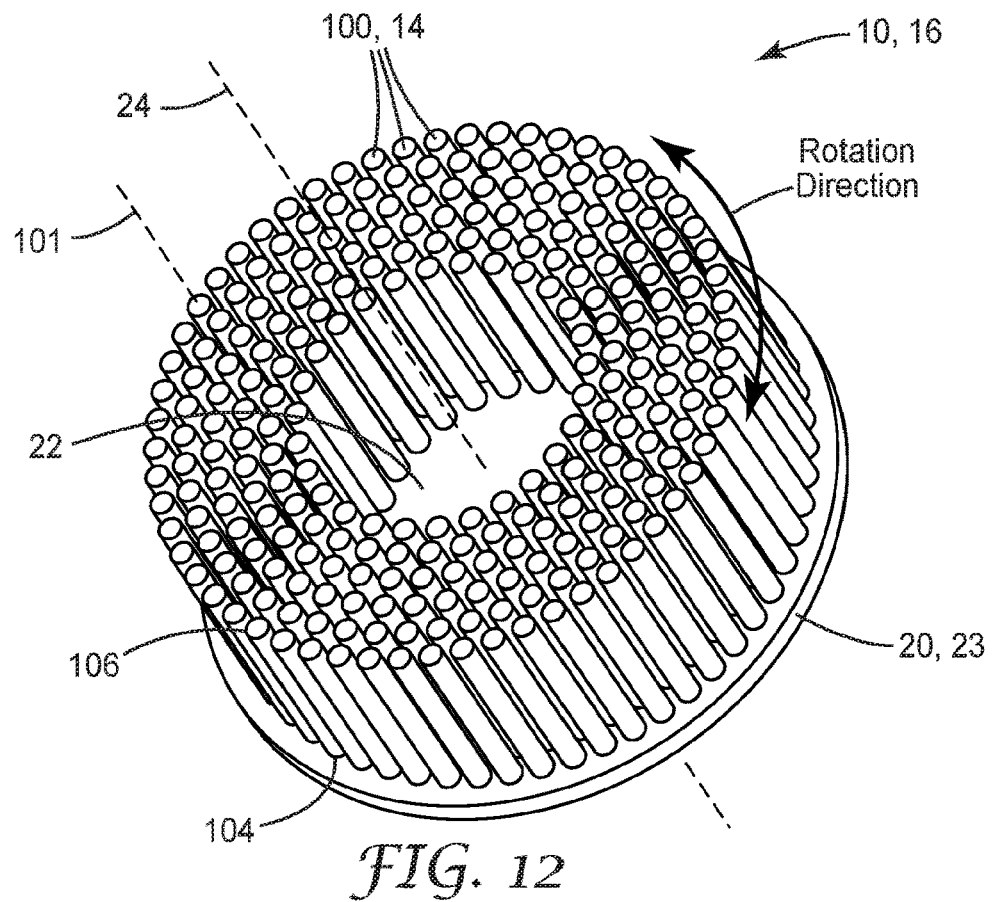
Figure 13:
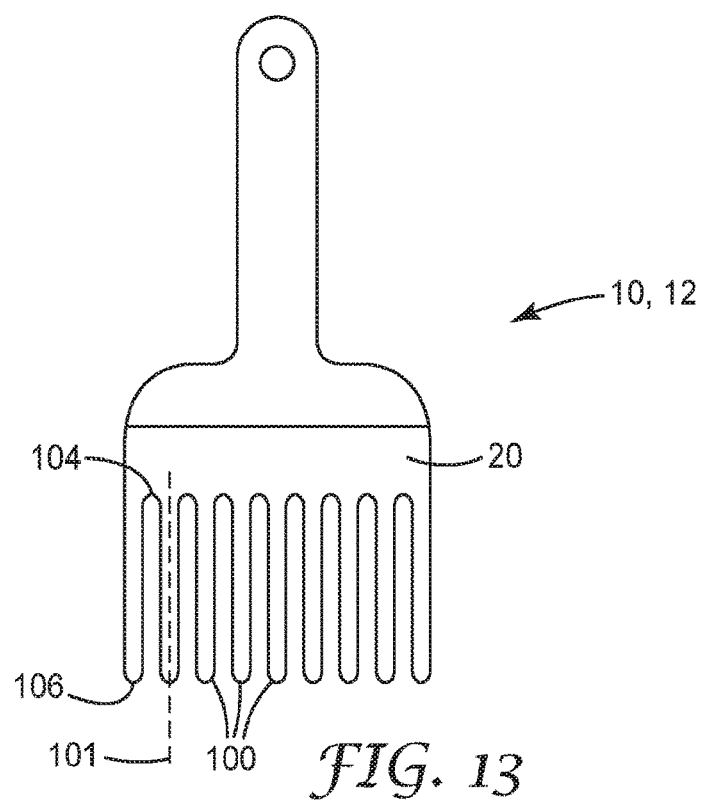
Figure 14:
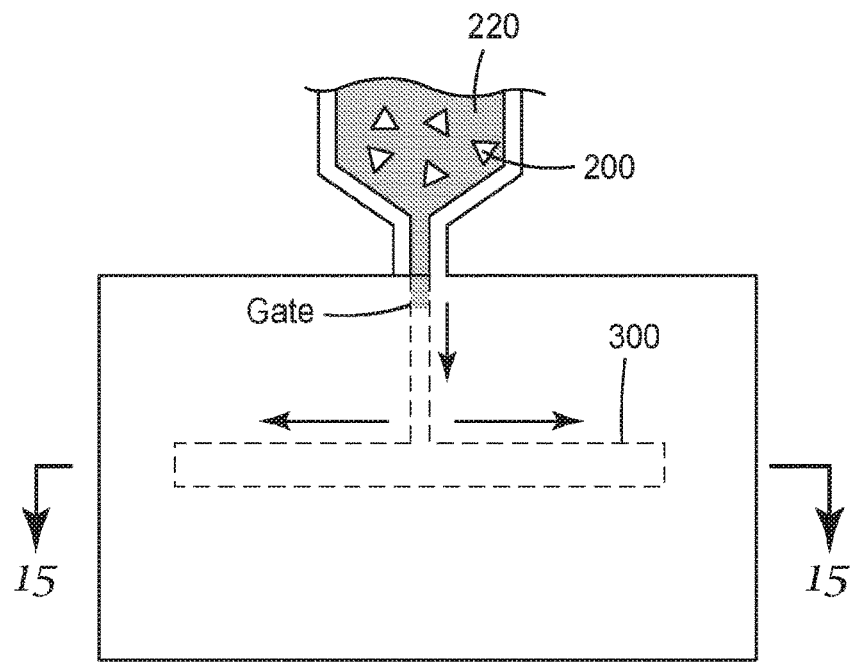
FIG. 14 is a schematic representation of an exemplary apparatus including a mold for making abrasive articles comprising elongate abrasive elements.
Figure 15:
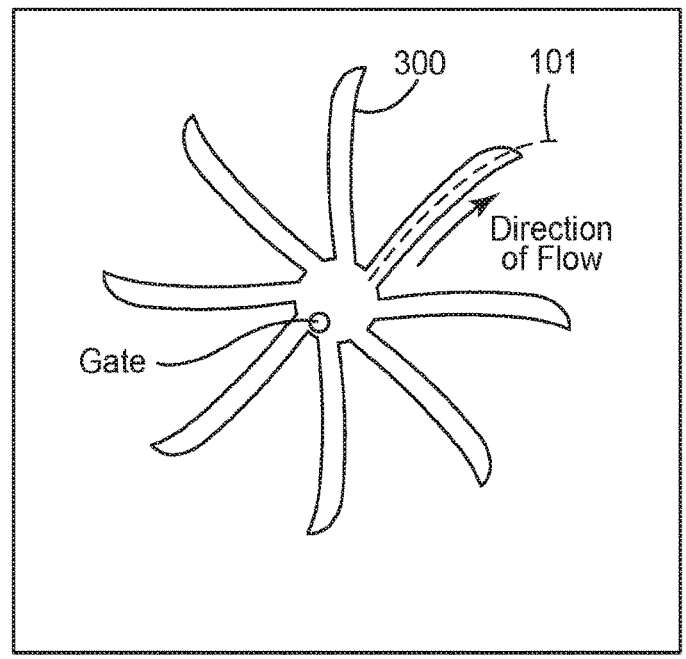
FIG. 15 is a schematic cross-section view taken at 15-15 of FIG. 14 depicting a plan view of the mold cavity of FIG. 14.
Figure 16:
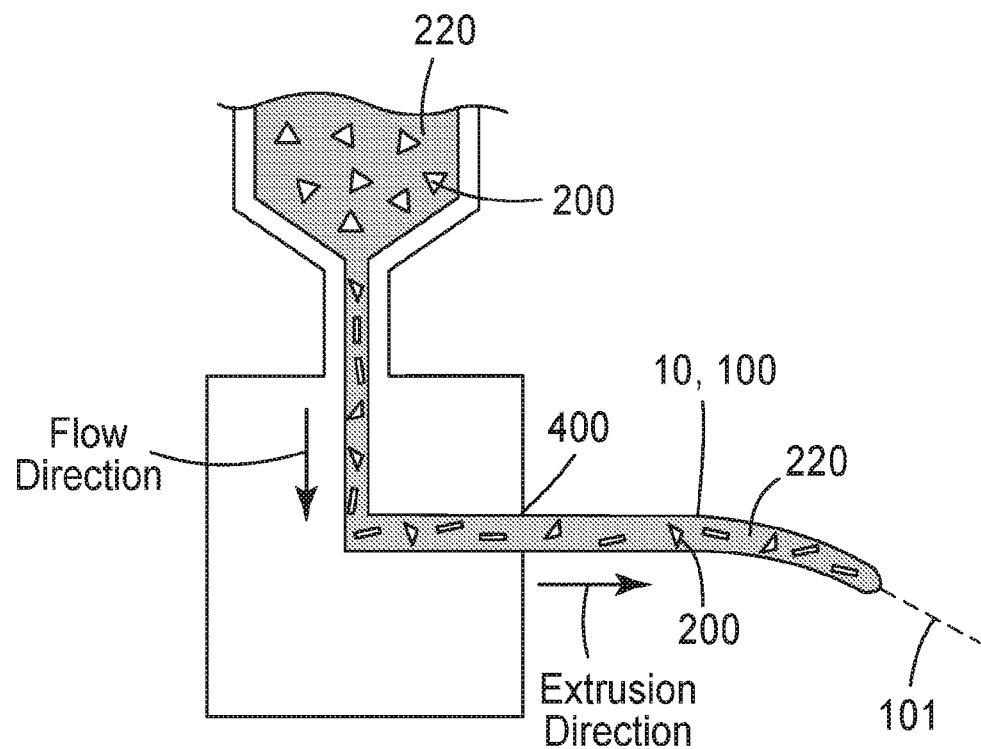
FIG. 16 is a schematic representation of an exemplary extrusion apparatus including a die for making abrasive articles comprising elongate abrasive elements.
Figure 17:
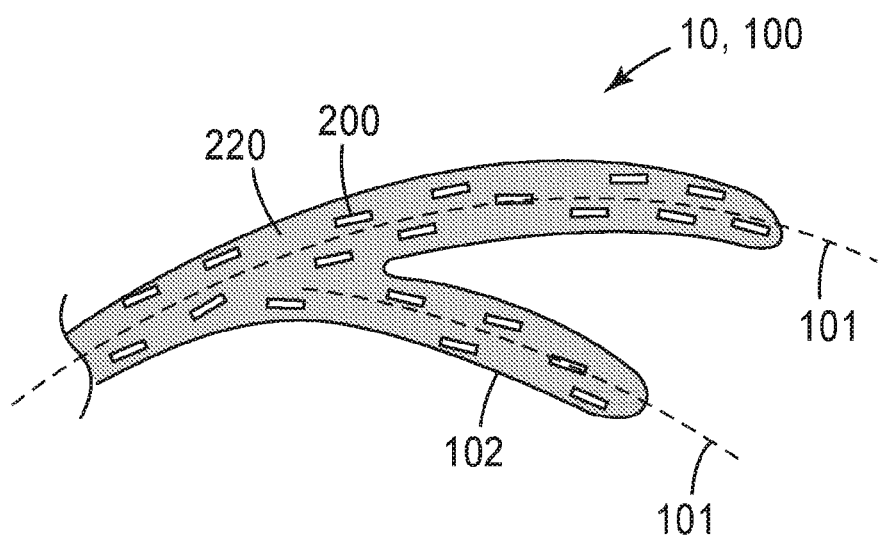
FIG. 17 is a partial view of an exemplary elongate abrasive element comprising a branch elongate abrasive element.
Figure 18:
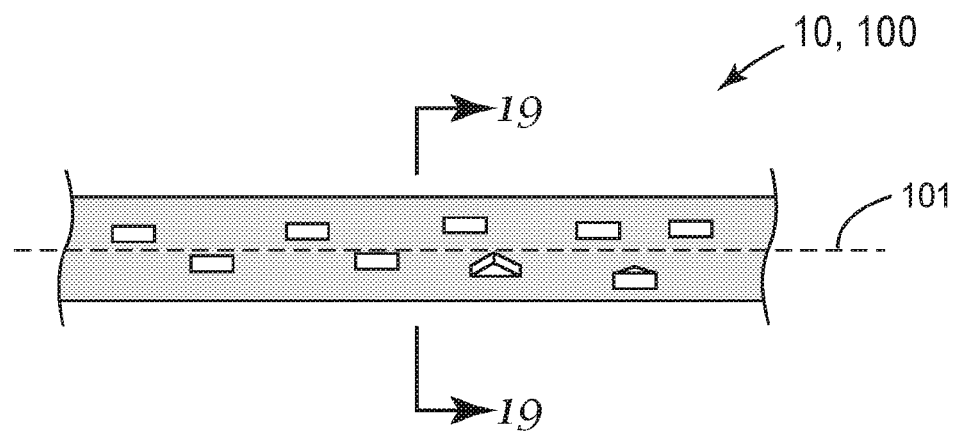
FIG. 18 is a partial side view of an exemplary elongate abrasive element.
Figure 19:
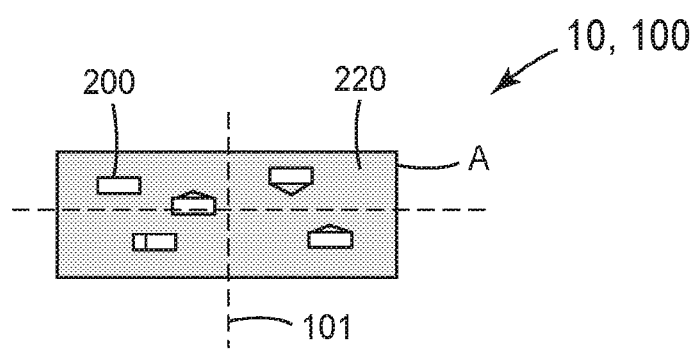
FIG. 19 is a schematic cross-section taken at 19-19 of FIG. 18.
Figure 20:
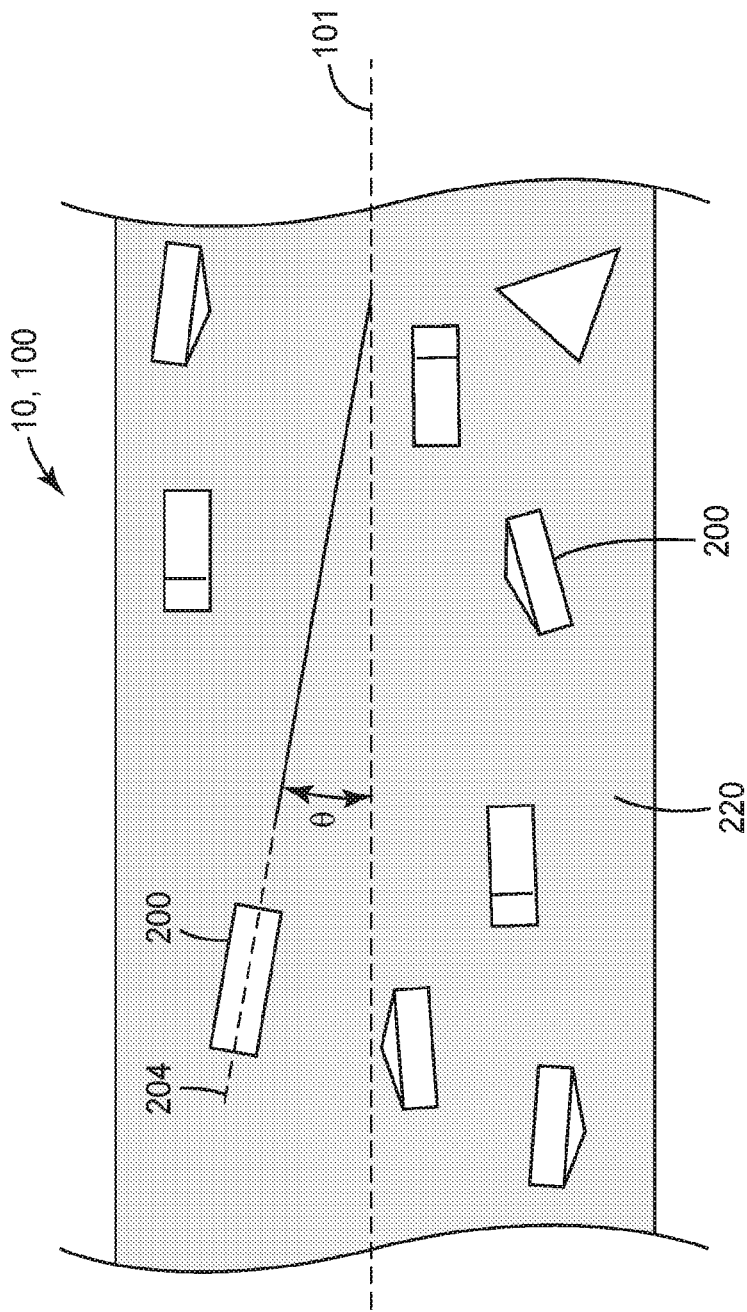
FIG. 20 is a partial side view of an exemplary elongate abrasive element.

Referring to FIGS. 11 and 12, an abrasive article 10 may comprise a hub 22. A plurality of primary elongate abrasive elements 100 (e.g., bristles 14) may project outwardly from the hub 22, beginning at element roots 104 (i.e., the end most proximal to the hub 22) and ending at element ends 106 (i.e., the end most distal from the hub 22). There may be spaces between element roots 104 in which an outer edge 23 of hub 22 is exposed. Alternatively, adjacent elements 100 may adjoin one another at roots 104. Article 10 may be integrally molded such that primary elongate abrasive elements 100 and hub 22 are continuous with one another. In one embodiment, article 10 is an abrasive article which comprises a composition of formed abrasive particles 200 in a binder 220. Abrasive articles according to the present disclosure may optionally comprise elongate abrasive elements that contain combinations of formed abrasive particles along with other abrasive or non-abrasive particles, for example, crushed abrasive particles, filler particles, grinding aids, etc.

Figure 3:
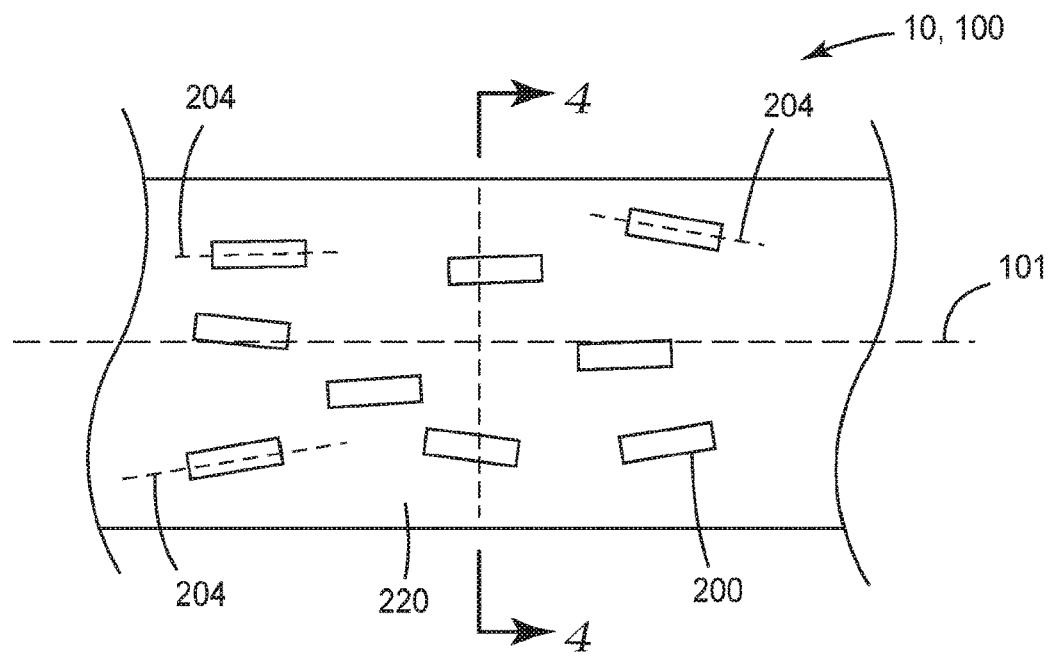
FIG. 3 is a partial side view of an exemplary elongate abrasive element.
Figure 4:
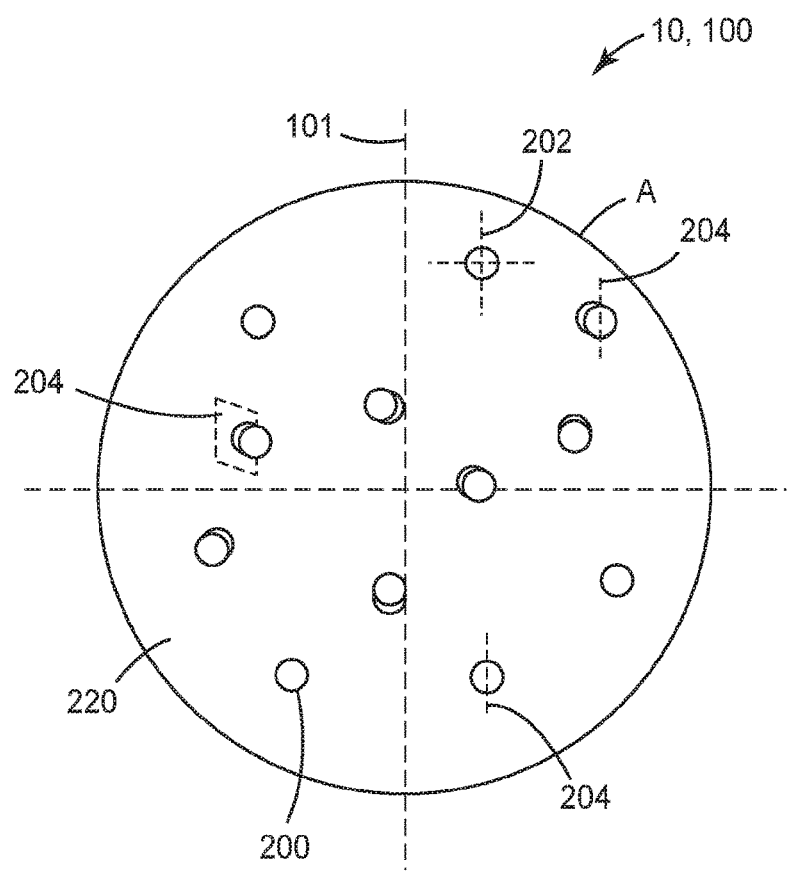
FIG. 4 is a schematic cross-section taken at 4-4 of FIG. 3.

A plurality of articles 10 can be assembled onto main shaft to form an abrasive assembly, akin to what is shown and described with respect to FIGS. 3a and 3b of U.S. Pat. No. 5,903,951 to Ionta et al. Any number of articles 10 may be assembled together to provide an abrasive assembly of any desired width. Preferably, the articles 10 are adjacent one another such that there is essentially no space between the articles. Alternatively, the articles 10 may be assembled onto to a shaft so as to have space between adjacent articles. For example, there may be 5 to 10,000 articles 10 assembled together to form abrasive assembly, although more or less may be used as desired. A means for providing segment-to-segment engagement may be included to reduce or eliminate rotation of adjacent articles relative to one another. Such engagement means can include, for example, an interengaging saw tooth pattern or hole and dimple pattern on the surfaces of hub 22.

The materials, manufacturing process and article configuration will depend upon the desired refining application. As used herein, the term "refine" includes at least one of the following: remove a portion of a workpiece surface; impart a surface finish to a workpiece; descale a surface; deburr a surface; clean a workpiece surface, including removing paint or other coatings, gasket material, corrosion, oil residue, or other foreign material or debris; or some combination of the foregoing. In some applications, it may be preferred to provide aggressive abrasive characteristics, in which case the article may comprise abrasive particles, larger size abrasive particles, harder abrasive particles, a higher abrasive particle to binder ratio, or some combination of the above. In other applications, it may be preferred to provide a polish type finish to the surface being refined, or to clean a surface without removing surface material itself, in which case the article may employ smaller abrasive particles, softer abrasive particles, lower abrasive particle to binder ratio, or some combination of the above. It is possible to employ formed abrasive particles 200 of varied composition and hardness to obtain the desired abrading characteristics, as well as blends of conventional and formed abrasive particles.

Hub

In one embodiment, hub 22 is a continuous circumferential portion which is generally planar. It is also within the scope of the invention to have a contoured or curved hub. For example, hub 22 may be convex, concave, or conical in shape. Hub 22 may be, for example, conical, with the primary elongate abrasive elements 100 extending parallel to the conical surface defined by the hub.

Article 10 may optionally have an attachment means on hub 22, such as a channel, keyway, or a root to mechanically join several articles together on a drive means (e.g., a shaft) to provide an abrasive assembly. A hub 22 may include one or more mounting holes, through which a locking rod and/or shaft may be inserted. Shaft and/or locking rod(s) may then be attached to a suitable rotary drive means.

Hub 22 can preferably have a thickness of from about 0.5 to 25 mm, more preferably from about 1.0 to 10 mm, still more preferably from about 1.5 to 6 mm, and most preferably from about 1.5 to 3 mm. Hub 22 may be circular as illustrated in FIGS. 11 and 12. The diameter of the outer edge 23 of hub 22 is preferably from about 2.5 to 61.0 cm (1.0 to 24.0 in), although smaller and larger hubs are also within the scope of the invention. In one preferred embodiment, the hub 22 is of a suitable material and thickness to provide a flexible hub 22, which helps maintain more bristles in contact with an uneven or irregular workpiece. The hub 22 preferably is capable of flexing at least 10°, more preferably at least 20°, and still more preferably at least 45° without damage or substantial permanent deformation to the hub. Hub shapes other than circular are also within the scope of the invention, including, but not limited to, oval, rectangular, square, triangular, diamond, and other polygonal shapes, as are relatively rigid or inflexible hubs.

Hub 22 may alternately be a ring sector bounded on each side by radial edges as described in U.S. Pat. No. 5,903,951 to Ionta et al. Preferably, the ring sector is of an angular width that allows for an integer number of ring sectors to be assembled into a circumferential article. For example, four 90° ring sectors are readily arranged to make a 360° circumferential article.

In one embodiment, hub 22 is molded integrally with the primary elongate abrasive elements 100 to provide a unitary article. Thus, no adhesive or mechanical means is required to adhere primary elongate abrasive elements 100 to hub 22. In such embodiments, hub 22 and primary elongate abrasive elements 100 may be molded simultaneously.

Abrasive Elements

To make an abrasive article, there may be a single mixture of formed abrasive particles 200 and binder 220 placed in the mold in a single injection process. In such an embodiment, the abrasive article may comprise a generally homogenous composition throughout. However, due to the molding process, the abrasive particle/binder mix may not be perfectly homogeneous. For example, as the polymer and abrasive mix is injected into the mold, narrow cavities may cause more polymer to initially cool adjacent the inside of a cavity near its base or proximal end, forcing a mix having a somewhat higher concentration of abrasive particles toward the distal end of the cavity/element.

Alternatively, there may be two or more insertions of a binder 220 to the mold. For example, one insertion may contain a mixture of binder 220 and formed abrasive particles 200, located primarily in primary elongate abrasive elements 100. A second insertion may contain binder 220 without formed abrasive particles 200, or with fewer or a different type of abrasive particles, located primarily in hub 22 of article 10. It is also within the scope of this invention to have two insertions, both containing abrasive particles. The first insertion may have abrasive particles of a certain size, material, and/or hardness, while the second insertion may include different abrasive particles. During abrading, the abrasive particles nearer end or distal end are used first, and then the abrasive particles nearer the proximal end (i.e., nearer the end connected to the hub 22) are used.

Primary elongate abrasive elements 100 extend from outer edge 23 of hub 22, beginning at element roots 104 and ending at element ends 106 remote from hub 22. In one preferred embodiment, primary elongate abrasive elements 100 extend radially from the outer edge 23 of the hub 22, and are coplanar with the hub 22. For ease of molding (described more fully below), it may be preferable to have a single row of primary elongate abrasive elements 100 arranged around the outer edge 23. Alternatively, a double row of bristles may be formed. Primary elongate abrasive elements 100 may extend from outer edge 23 of hub 22 in a plane parallel to the plane of hub 22, whether hub 22 is planar or conical or some other shape. Alternatively, primary elongate abrasive elements 100 may extend from outer edge 23 of hub 22 at any oblique angle relative to the applicable plane of the hub.

Primary elongate abrasive elements 100 may have any cross-sectional area A, including but not limited to, circular, star, half moon, quarter moon, oval, rectangular, square, triangular, diamond, or other polygonal shape. In one embodiment, primary elongate abrasive elements 100 comprise a constant cross section along their length. In other embodiments, primary elongate abrasive elements 100 will have a non-constant or variable cross section along their length.

Primary elongate abrasive elements 100 may be tapered such that the cross-sectional area A of the element decreases in the direction away from element root 104 towards element end 106. Tapered primary elongate abrasive elements 100 can have any cross section as described above. Primary elongate abrasive elements 100 may be subjected to bending stresses as article 10 is rotated against a workpiece. These bending stresses may be highest at the element root 104 of primary elongate abrasive elements 100 (at outer edge 23).

Therefore, in some embodiments a tapered element is more able to resist bending stresses than an element of constant cross-sectional area A. Primary elongate abrasive elements 100 can have a taper along the entire length, or can have a tapered portion adjacent the element root 104 and a constant cross-sectional area A for the remainder of the element. The taper can comprise any suitable angle. Furthermore, article 10 can include a fillet radius at the transition between element root 104 of element 100 and outer edge 23 of hub 22.

Figure 9:
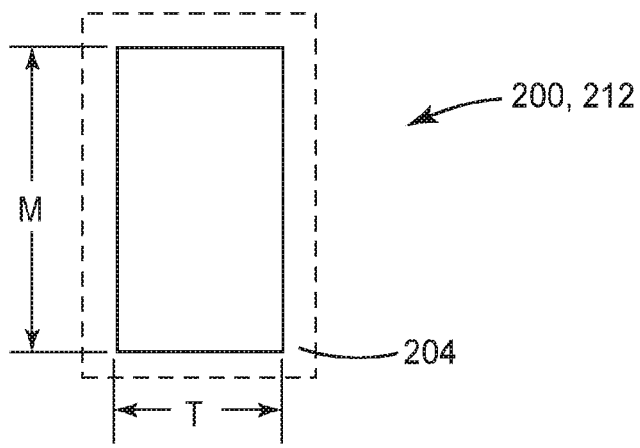

Primary elongate abrasive elements 100 comprise an aspect ratio defined as the length of element 100 measured from outer element root 104 to element end 106, divided by the width of the element. In the case of a tapered element, the width is defined as the average width along the length for purposes of determining the aspect ratio. In the case of non-circular cross section, the width is taken as the longest width in a given plane, such as the corner-to-corner diagonal of a square cross section. The aspect ratio of primary elongate abrasive elements 100 is preferably at least 2, more preferably from about 5 to 100, and still more preferably from about 50 to 75. The size of primary elongate abrasive elements 100 can be selected for the particular application of article 10 and brush. The length of primary elongate abrasive elements 100 is preferably from about 0.2 to 50 cm, more preferably from about 1 to 25 cm, and still more preferably from about 5 to 15 cm. The width of the primary elongate abrasive elements 100 is preferably from about 0.25 to 10 mm more preferably from about 0.5 to 5.0 mm, still more preferably about 0.75 to 3.0 mm, and most preferably from about 1.0 to 2.0 mm. The width of primary elongate abrasive elements 100 can be the same as or different from the thickness of hub 22. In one preferred embodiment, all of the primary elongate abrasive elements 100 have the same dimensions. Alternatively, primary elongate abrasive elements 100 on a brush comprising a plurality of articles 10 may have different dimensions such as different lengths, widths or cross-sectional areas. For example, an article 10 may have two groups of short primary elongate abrasive elements and two groups of long primary elongate abrasive elements, similar to what is shown in FIG. 9 of U.S. Pat. No. 5,903,951 to Ionta et al. Moreover, it is possible to arrange ring sector segments, each having elements of different length. With respect to the brush abrasive assembly, it is possible to employ adjacent articles 10 having different elements.

The density and arrangement of primary elongate abrasive elements 100 can be chosen for the particular application of article 10 and brush. Primary elongate abrasive elements 100 may are arranged uniformly around the outer edge 23 of hub 22. Alternatively, primary elongate abrasive elements 100 can be arranged in groups with spaces between the groups, and can be oriented in the plane of hub 22 other than radially outward, that is, at a non-zero angle relative to the radius of hub 22. Accordingly, article 10 may have a portion of outer edge 23 which does not include any primary elongate abrasive elements 100. The elements may be present over only a portion of outer edge 23 of hub 22, or substantially the entire outer edge 23. Primary elongate abrasive elements 100 may or may not abut adjacent elements as desired.

The material, length, and configuration of the elements are preferably chosen such that primary elongate abrasive elements 100 are sufficiently flexible to aid in refining uneven or irregular workpieces. The primary elongate abrasive elements 100 are preferably capable of bending at least 25°, more preferably at least 45°, still more preferably at least 90°, and most preferably about 180°, without damage or substantial permanent deformation to the elements.

It is possible to reinforce the primary elongate abrasive elements 100 with any suitable structure. For example, it is possible to place a reinforcing fiber or wire in the element mold cavities, and inject the binder 220 around the reinforcing wire. This will result in a element 100 having a reinforcing wire or fiber embedded within it.

In one embodiment, the primary elongate abrasive elements 100 are swept back at an angle relative to a radius of the hub in a direction opposite to that of the direction of rotation of the article in operation. Such an arrangement may help to minimize breakage of primary elongate abrasive elements 100 near their root where the bristles join the outer edge 23 of the hub 22. When the article is rotated and the ends of the bristles contact a workpiece, this tends to bend the bristles in a direction opposite to the direction of rotation. If this bending force is excessive, an element 100 may break at its root. When an article as described in this embodiment is rotated about an axis perpendicular to the hub 22 and passing through the center of attaching means, the back-swept primary elongate abrasive elements 100 will be subject to centrifugal force. This force will cause the element 100 to bend in a direction towards a radial line. This bending caused by centrifugal force acts opposite to the bending caused by the bristle contacting a workpiece. Therefore, the bristle can withstand a greater amount of bending caused by the workpiece than could a bristle that is initially oriented along the radius. The angle at which elements are swept back is preferably up to 45°, more preferably between about 5° and 35°, still more preferably between about 10° and 30°, and most preferably approximately 22.5°, although other angles may be used as desired. In one embodiment, the hub 22 of the article 10 has an outer diameter at outer edge 23 of approximately 2.5 cm (1 inch) and a thickness of approximately 2.5 mm (0.1 inches), with 30 primary elongate abrasive elements 100 extending outwardly from outer edge 23 in the plane of the hub 22. Each element 100 is approximately 2.25 cm (0.88 inches) long and tapers from approximately 3.0 mm (0.12 inches) thick at the root to approximately 2.0 mm (0.08 inches) thick at the end, with a generally square cross-section. The just-described dimensions of article 10 and number of primary elongate abrasive elements 100 are merely exemplary of one preferred embodiment, the present invention is not thereby limited.

Figure 21:
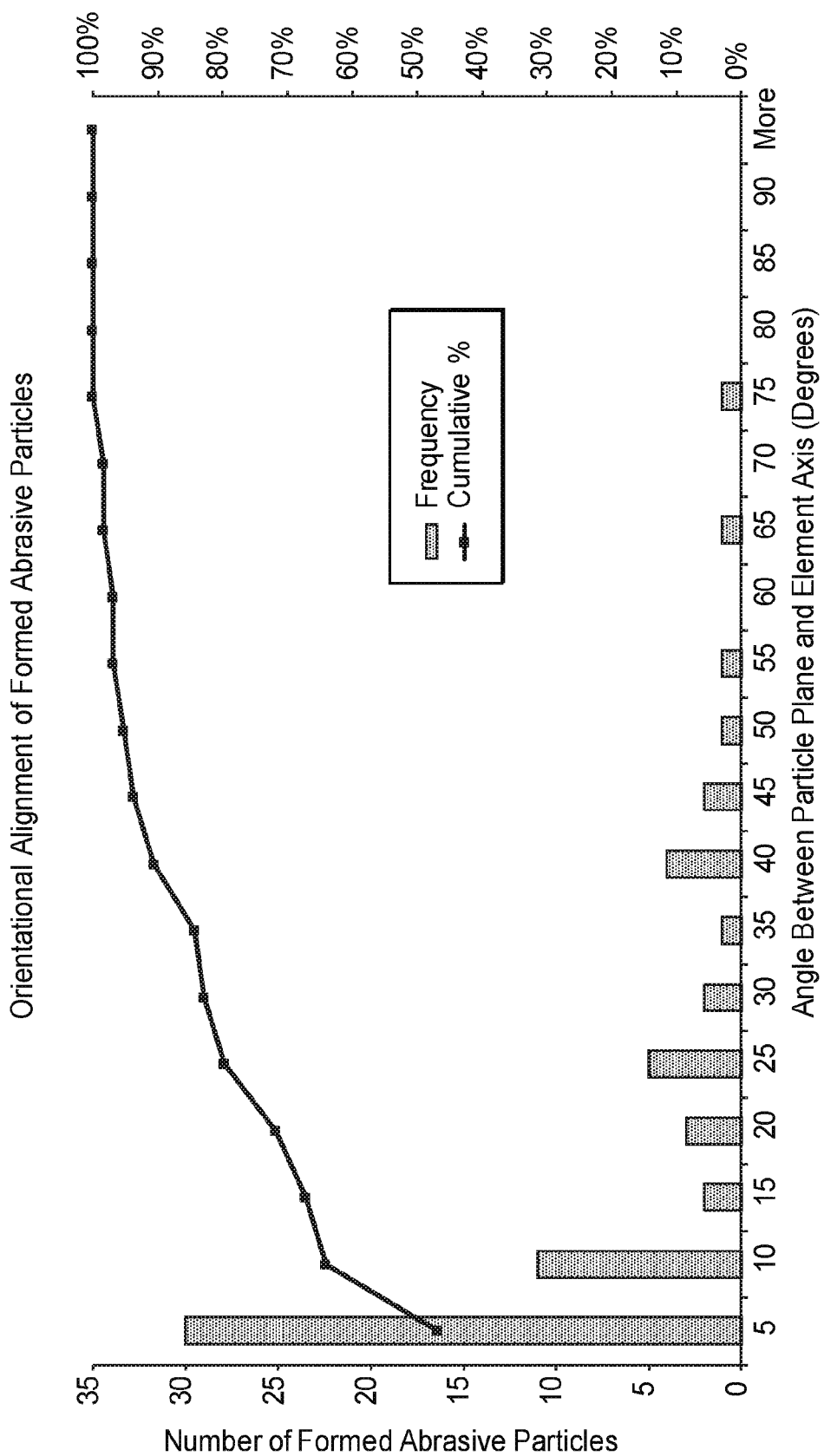
FIG. 21 is a chart depicting the orientational alignment of formed abrasive particle in an exemplary elongate abrasive element.
Figure 22:
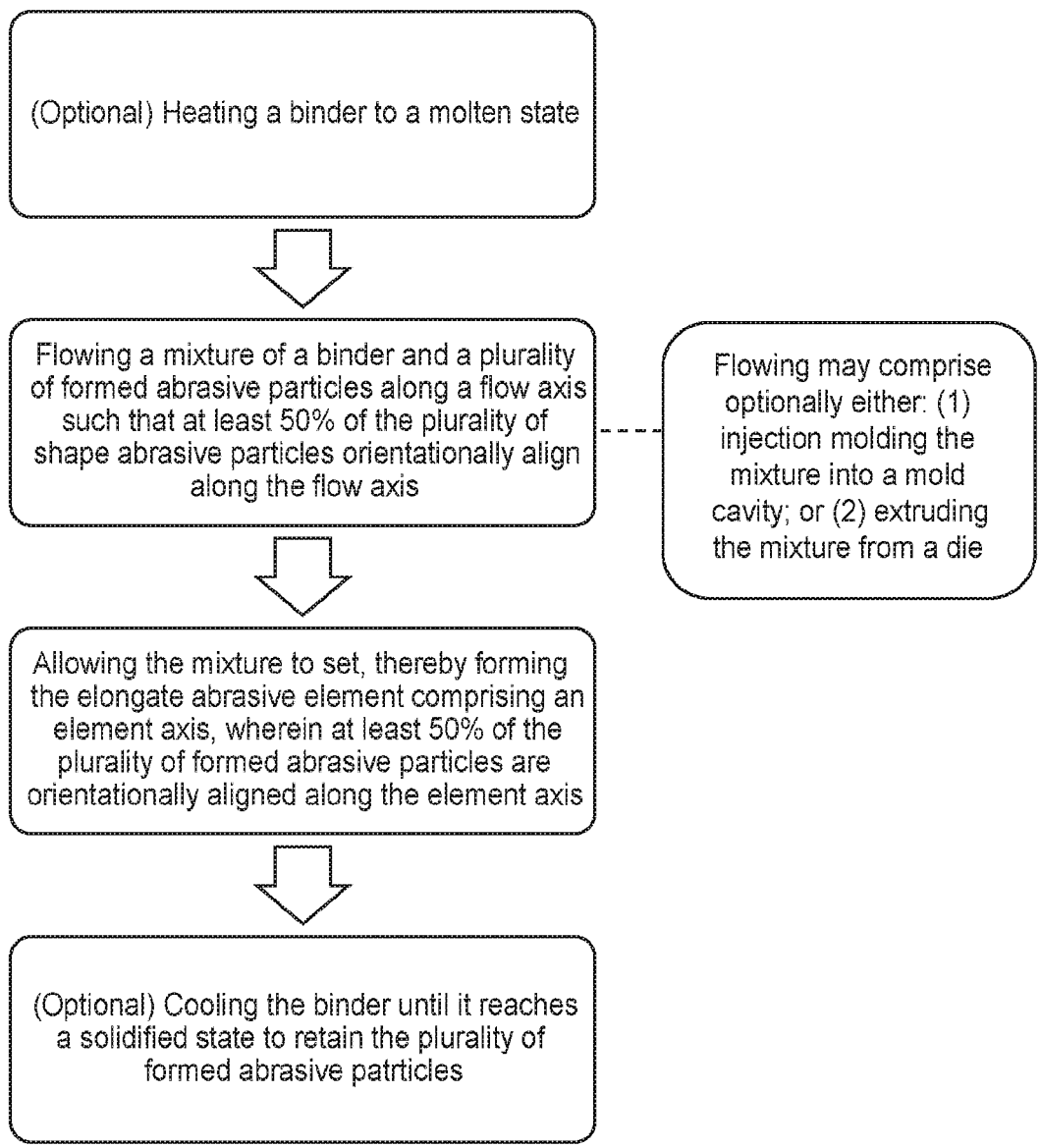
FIG. 22 is a flow chart depicting exemplary methods according to the present disclosure.
Figure 23:
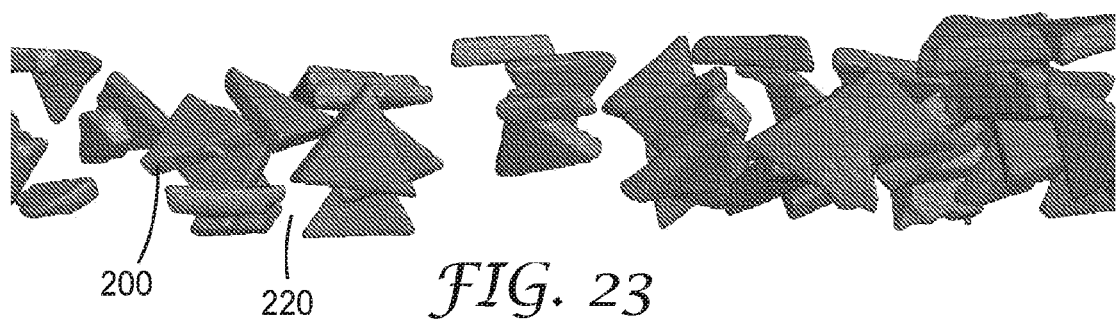
FIGS. 23-25 are renderings of an exemplary elongate abrasive element generated by X-ray microtomography.
Figure 24:
Figure 25:

In some embodiments, the primary elongate abrasive elements 100 are at an angle β relative to the plane of the hub 22, as shown and described in FIGS. 21-22 of U.S. Pat. No. 5,903,951 to Ionta et al., the disclosure of which is hereby incorporated by reference in its entirety.

Formed Abrasive Particles

Figure 1:
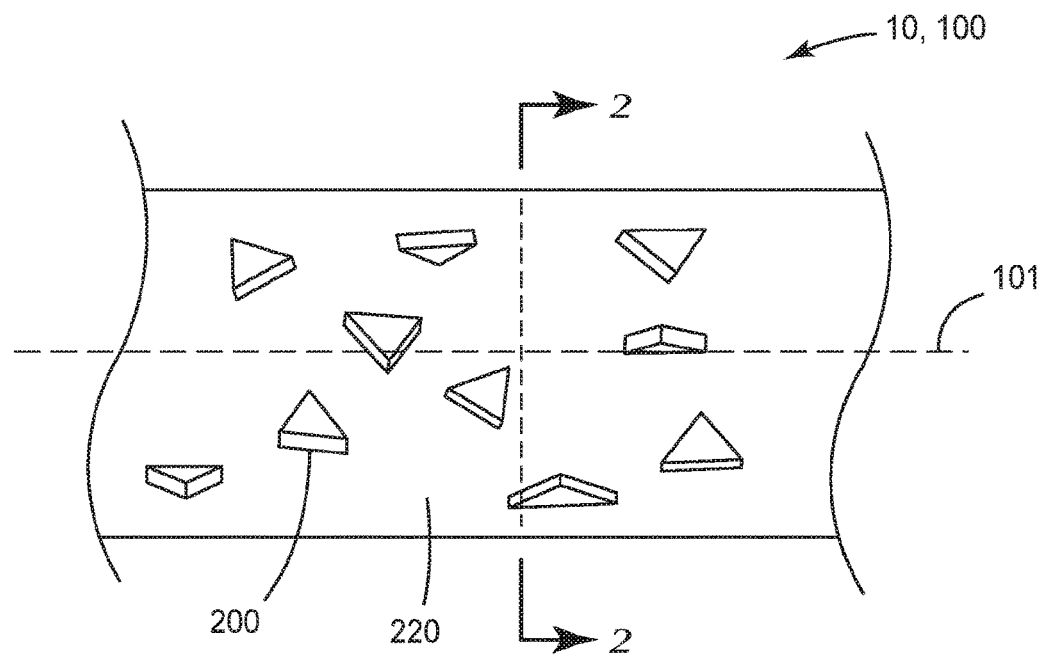
FIG. 1 is a partial side view of an exemplary elongate abrasive element.
Figure 2:
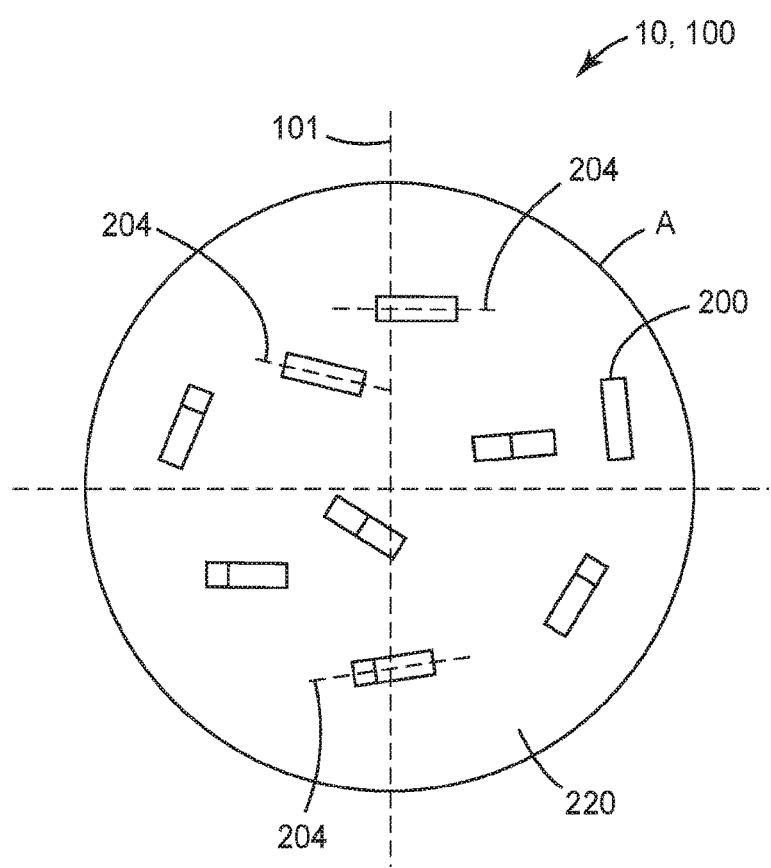
FIG. 2 is a schematic cross-section taken at 2-2 of FIG. 1.
Figure 5:
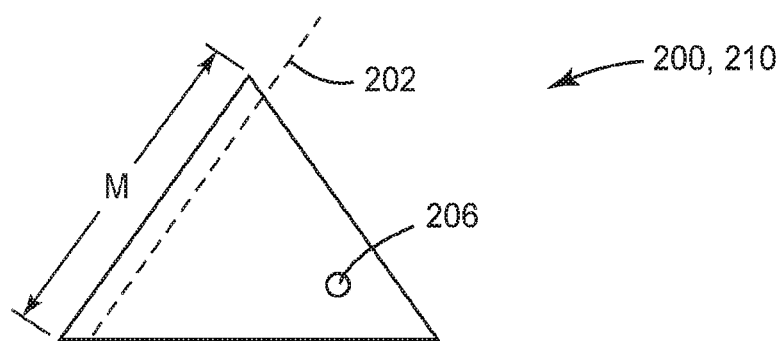
FIGS. 5-7 depict exemplary formed abrasive particles.
Figure 6:
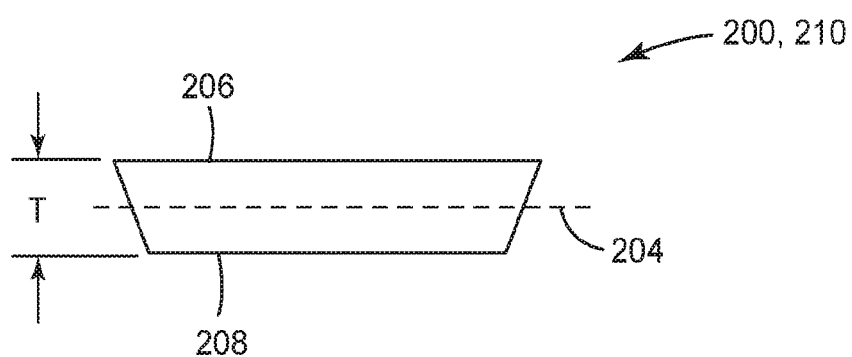
Figure 7:
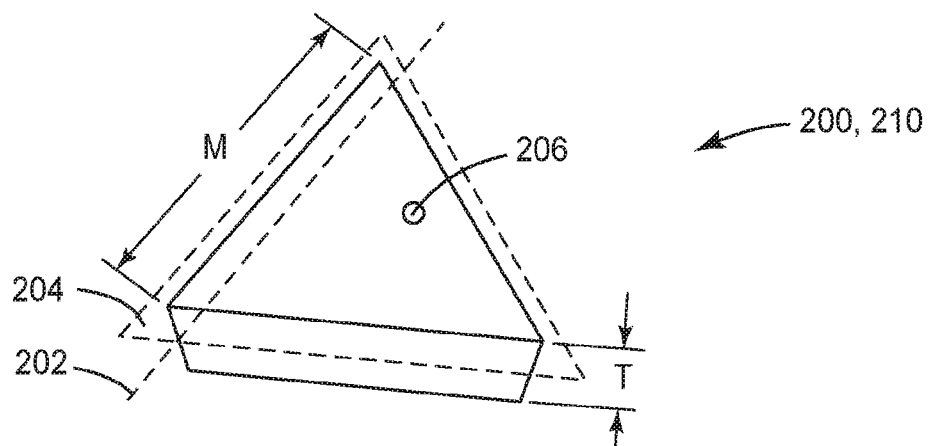

In some embodiments, formed abrasive particles comprise first and second major faces (206 and 208, respectively) that are separated by a thickness. Examples of such formed abrasive particles are depicted in FIGS. 5-7. In such embodiments, the particle axis 202 is defined along one of the first face or the second face, the first and second faces are substantially parallel with one another, and the particle plane is substantially parallel to the first and/or second major face. By "substantially parallel," it is meant that planes and/or planar surfaces are within 20 degrees of parallel with one another. In the case of first and second faces 206 and 208, planes drawn to coincide with each face are substantially parallel. In the case where one or both of the first face 206 and the second face 206 are not themselves exactly planar, the reference plane is drawn through each extremity of the face (in the depicted case, each of the three vertices of the triangular shape). For example, in the case of dish-shaped abrasive particles as described in WO2010/077491, a reference plane for one face would be drawn through each of the three tips 30 as depicted in FIG. 1A or 3A thereof, while the opposite reference plane would be drawn through the three vertices of the opposing face. It should therefore be understood that the separation of the first face 206 and the second face 208 need not be precisely the same as a thickness T of the formed abrasive particle, although it will likely be approximated by it. In one embodiment wherein formed abrasive particles comprise first and second major faces 206 and 206, the formed abrasive particles comprise triangular particles 210, wherein the first and second major faces are triangles. In some embodiments, such as those shown in FIGS. 5-7, the triangles comprise equilateral triangles. In the embodiments shown, the maximum dimension M of the triangular particles is the length of one side of the triangle (the larger of the two triangles if the first face and second face are of differing size), and the thickness T is the smallest distance between the first major face 206 and the second major face 208.

Figure 8:
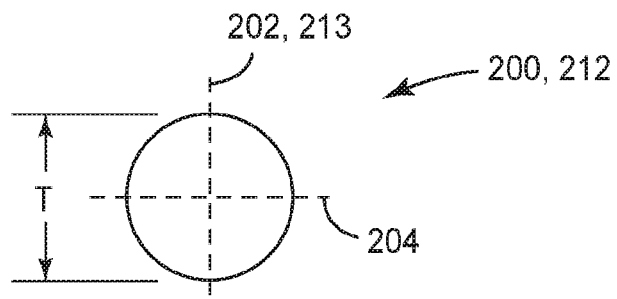
FIGS. 8-10 depict exemplary formed abrasive particles.
Figure 10:
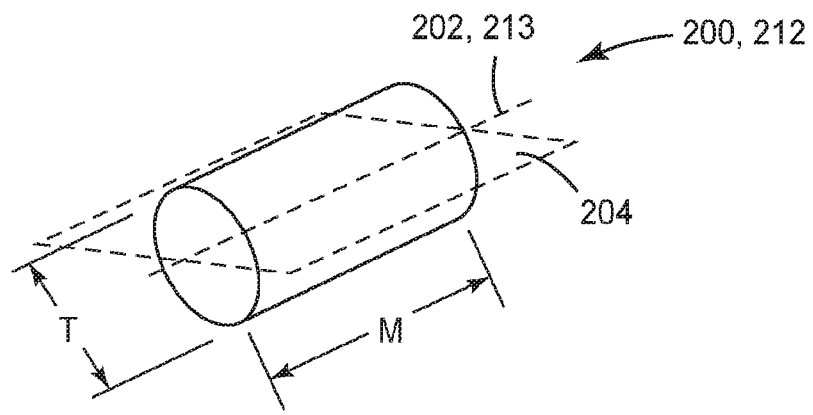

In one embodiment, formed abrasive particles comprise rod-shaped particles 212, wherein a rod axis 213 is defined along the particle axis 202. Examples of such formed abrasive particles are depicted in FIGS. 8-10. As shown, the thickness T of the rod-formed abrasive particles is ostensibly the cross-sectional diameter of the rod, and the maximum dimension of the rod-shaped particles is ostensibly the length of the rod.

In one embodiment, a ratio "R" is defined as the ratio of the maximum dimension M to the thickness T, and is 3 or greater. In some embodiments, R is 2.5 or greater. In some embodiments, R is 3.5 or greater. In some embodiments, R is 4 or greater. In some embodiments, including the aforementioned embodiments, R is 10 or less. In some embodiments, including the aforementioned embodiments, R is 8 or less. In some embodiments, including the aforementioned embodiments, R is 6 or less.

Orientation of Formed Abrasive Particles

As shown in FIGS. 1-4 and 17-20, an elongate abrasive element 100 (which may be part of an abrasive article 10) comprises a plurality of formed abrasive particles 200 that are orientationally aligned (precisely, generally, or both) along an element axis 101. As shown, the formed abrasive particles 200 are encased in a binder 220.

As used herein, the term "formed abrasive particle" means an abrasive particle that has been deliberately formed such that at least a portion of the abrasive particle has a predetermined shape. Often the shape is replicated from a mold cavity or other tooling used to form the precursor formed abrasive particle. The formed abrasive particle will generally have a predetermined geometric shape that substantially replicates the mold cavity or other form of tooling that was used to form the formed abrasive particle. The cavity or tooling could reside on the surface of an embossing roll or be contained within a flexible belt or production tooling. Alternatively, the formed abrasive particles can be extruded and cut to length or precisely cut from a sheet of dried sol-gel (or other precursor or cured material if not ceramic-based) by a laser beam into the desired geometric shape. Alternatively, the formed abrasive particle may be injection molded or 3D-printed.

As shown in FIGS. 5-10, the formed abrasive particles comprise a maximum dimension "M," a thickness "T" measured normally to the maximum dimension M, a particle axis 202 defined along the maximum dimension M, and a particle plane 204 containing the particle axis 202 and defined normally to the thickness T. By "precisely orientationally aligned," it is meant that the particle plane 202 is oriented within 15 degrees of parallel to the element axis 101. In some embodiments, a greater amount of formed abrasive particles are precisely orientationally aligned along the element axis than would occur randomly. In some embodiments, at least 50% of the formed abrasive particles are precisely orientationally aligned along the element axis. In some embodiments, at least 66% of the formed abrasive particles are precisely orientationally aligned along the element axis.

In addition, or in the alternative, to a quantity of formed abrasive particles being precisely orientationally aligned as described above, in some embodiments, formed abrasive particles are generally orientationally aligned along the element axis 101. By "generally orientationally aligned," it is meant that the particle plane 202 is oriented within 60 degrees of parallel to the element axis 101. In some embodiments, at least 50% of the formed abrasive particles are generally orientationally aligned along the element axis. In some embodiments, at least 66% of the formed abrasive particles are generally orientationally aligned along the element axis. In some embodiments, at least 75% of the formed abrasive particles are generally orientationally aligned along the element axis. In some embodiments, at least 90% of the formed abrasive particles are generally orientationally aligned along the element axis. In some embodiments, at least 95% of the formed abrasive particles are generally orientationally aligned along the element axis. In some embodiments, at least 96% of the formed abrasive particles are generally orientationally aligned along the element axis.

As can be understood from the above, a formed abrasive particle 200 that is precisely orientationally aligned will also be generally orientationally aligned, while a formed abrasive particle 200 that is generally orientationally aligned is not necessarily also precisely orientationally aligned. In one embodiment, at least a majority of the formed abrasive particles are precisely orientationally aligned, and at least 75% of the formed abrasive particles are generally orientationally aligned. In one embodiment, at least a majority of the formed abrasive particles are precisely orientationally aligned, and at least 90% of the formed abrasive particles are generally orientationally aligned. In one embodiment, at least a majority of the formed abrasive particles are precisely orientationally aligned, and at least 95% of the formed abrasive particles are generally orientationally aligned. In one embodiment, at least 66% of the formed abrasive particles are precisely orientationally aligned, and at least 95% of the formed abrasive particles are generally orientationally aligned.

In addition to, or in conjunction with, the embodiments described above where formed abrasive particles are generally and/or precisely orientationally aligned, in some embodiments the particle axis of at least 40% of the formed abrasive particles is within 5 degrees of parallel to the element axis 101, and/or the particle axis of at least 60% of the formed abrasive particles is within 10 degrees of parallel to the element axis 101.

It should be understood that the aforementioned combinations are merely exemplary, and that any combination of applicable ranges may be selected within the scope of the present disclosure.

Orientation of formed abrasive particles within an elongate abrasive element may be accomplished by any means capable of resulting in the degree and frequency of orientation described herein. The following methods or orientation are exemplary and not intended to be limiting.

For example, an elongate section of liquid (e.g., molten or uncured) binder 220 may be cast or otherwise deposited into a mold, followed by precise placement of oriented formed abrasive particles 200 therein. In such embodiments, the formed abrasive particles 200 may be held in a tool or fixture in the desired orientation, positioned proximate the elongate section of liquid, and dropped or directly placed into the binder. Thereafter, the binder may be cooled and/or cured to form an elongate abrasive element 100 comprising formed abrasive particles 200 that are orientationally aligned along an element axis 101.

As another example, an elongate section of liquid (e.g., molten or uncured) binder 220 may be cast or otherwise deposited into a mold, followed by placement of oriented formed abrasive particles 200 therein. In such embodiments, loose formed abrasive particles 200 may dropped or otherwise forced through a screen, mask, grid, or the like positioned proximate the binder that comprises an opening dimension that is aligned with the elongate section of liquid and is smaller than a maximum dimension M of the formed abrasive particles, but nevertheless permits the particles to pass through. Formed abrasive particles will pass through the screen, mask, grid, or the like and into the binder. Thereafter, the binder may be cooled and/or cured to form an elongate abrasive element 100 comprising formed abrasive particles 200 that are orientationally aligned along an element axis 101.

As another example, a slurry of liquid (e.g., molten or uncured) binder 220 and formed abrasive particles 200 may be extruded from a die in such a manner that the flow of the liquid binder through the die along a flow axis is adapted to orient the formed abrasive particles 200 along the direction of liquid flow. Thereafter, the binder may be cooled and/or cured to form an elongate abrasive element 100 comprising formed abrasive particles 200 that are orientationally aligned along an element axis 101.

As another example, a slurry of liquid (e.g., molten or uncured) binder 220 and formed abrasive particles 200 may be injected into an elongate mold cavity in such a manner that the flow of the liquid binder through the elongate cavity along a flow axis is adapted to orient the formed abrasive particles 200 along the direction of liquid flow. Thereafter, the binder may be cooled and/or cured to form an elongate abrasive element 100 comprising formed abrasive particles 200 that are orientationally aligned along an element axis 101.

As another example, a slurry of liquid (e.g., molten or uncured) binder 220 and formed abrasive particles 200 may be deposited into an elongate mold cavity 300, wherein the formed abrasive particles are themselves magnetizable and/or comprise a magnetizable surface coating. The slurry thus deposited can be subjected to a magnetic field adapted to orientationally align the formed abrasive particles. The formed abrasive particles may by this method be orientationally aligned along the elongate dimension of the mold cavity (or optionally along another dimension as dictated by interaction with the magnetic field). Thereafter, the binder may be cooled and/or cured to form an elongate abrasive element 100 comprising formed abrasive particles 200 that are orientationally aligned along an element axis 101.

As another example, a slurry of liquid (e.g., molten or uncured) binder 220 and formed abrasive particles 200 may be deposited into an elongate mold cavity 300, wherein the formed abrasive particles are themselves magnetizable and/or comprise a magnetizable surface coating. The slurry thus extruded (or while still present in the mold) can be subjected to a magnetic field adapted to orientationally align the formed abrasive particles. The formed abrasive particles may by this method be orientationally aligned along the elongate dimension of the resulting elongate abrasive element (or optionally along another dimension as dictated by interaction with the magnetic field). Thereafter, the binder may be cooled and/or cured to form an elongate abrasive element 100 comprising formed abrasive particles 200 that are orientationally aligned along an element axis 101.

Attachment Means

Article 10 may include an attachment means as generally shown and described, for example, in U.S. Pat. No. 5,903,951. For example, several articles may be joined together to form an assembly as described therein, and/or one or more articles 10 may be attached to a support means such as a separate hub or shaft as described therein. Hub 22 may comprise an inner edge configured to engage with such a shaft, and/or may also (or alternatively) include mounting holes for accepting one or more locking rods. Hub 22 may include a channel or keyway configured to engage a suitably configured key in a shaft. As further described therein, hub 22 may be continuous, and not include an opening defined by an inner edge. An attachment means may be provided at the center of hub 22. This type of attachment means is suitable for use with 360° circular articles. Suitable attachment means are described in U.S. Pat. Nos. 3,562,968; 3,667,170; and 3,270,467 the entire disclosures of all of which are incorporated herein by reference. One preferred attachment means is the integrally-molded threaded stud adapted for screw-type engagement with a rotary tool as taught by U.S. Pat. No. 3,562,968. In such embodiments, it is preferred that the attachment means is molded integrally with the hub 22 and is centered relative to the hub 22 for proper rotation of article 10. The attachment means may be made from the same material as the rest of the article 10, and may contain abrasive particles. Alternatively, the attachment means may be made from a separate injection of binder 220 with or without abrasive particles.

It is also within the scope of this invention to use a hook and loop type attachment on hub 22 to attach the article 10 to a back-up pad of a power rotary tool. Suitable hook- and loop fasteners include those taught in U.S. Pat. No. 5,077,870, "Mushroom-Type Hook Strip for a Mechanical Fastener," (Melbye et al.), incorporated herein by reference, or of the type commercially available as SCOTCHMATE™ from Minnesota Mining and Manufacturing Company, St. Paul, Minn. It is also possible to use a hermaphroditic fastener such as DUAL LOCK™ fastener, available from Minnesota Mining and Manufacturing Company, to secure the molded article to a back up pad. It is also possible to employ intermeshing structured surfaces such as taught in U.S. Pat. No. 4,875,259, "Intermeshing Articles" (Appeldorn), incorporated herein by reference.

It is also within the scope of the present invention to use an attachment system where either the hub of the molded article or the back-up pad of the drive tool includes a layer of pressure sensitive adhesive, while the other of the article or back-up pad comprises a surface to which the pressure sensitive adhesive may releasably attach with the desired attachment strength. Examples of suitable pressure sensitive adhesives include latex crepe, rosin, acrylic polymers and copolymers such as polybutylacrylate and polyacrylate ester, vinyl ethers such as polyvinyl n-butyl ether, alkyd adhesives, rubber adhesives such as natural rubber, synthetic rubber, chlorinated rubber, and mixtures thereof. The adhesive is selected to provide the desired attachment characteristics. One preferred surface to which the abrasive may be releasably affixed is a vinyl sheet.

Alternatively, the hub of the molded article may contain one or more straight or threaded holes or openings so that the abrasive article may be mechanically secured (such as with a bolt and nut) to the back up pad. Such a hole may optionally be fitted with an insert of a different material from that of the central portion of the molded article.

Reinforcing Means

The hub 22 may further comprise reinforcing means which can comprise a fiber reinforcing substrate. Reinforcing means can comprise, for example, fabric, non-woven sheeting, mat, mesh, scrim, and the like, or can comprise individual fibers compounded into the moldable polymer and dispersed throughout the article. The reinforcing means may optionally contain a treatment to modify its physical properties. The purpose of the reinforcing means is to increase the flexural strength and tensile strength of the article 10. Examples of reinforcing fibers suitable for use in the present invention include glass fibers, metal fibers, carbon fibers, wire mesh, mineral fibers, fibers formed of heat resistant organic materials, or fibers made from ceramic materials. Ether organic fibers include polyvinyl alcohol fibers, nylon fibers, polyester fibers and phenolic fibers. If glass fibers are used, the moldable polymer mixture may preferably contain a coupling agent, such as a silane coupling agent, to improve the adhesion to the thermoplastic material.

Moldable Polymer

A moldable polymer material (e.g., a material that may result in binder 220), where employed, may be an organic binder material that is capable of being molded, i.e., it is capable of deforming under heat to form a desired shape. The moldable polymer may be a thermoplastic polymer, a thermosetting polymer, a thermoplastic elastomer, or combinations thereof. In the case of a thermoplastic polymer, the organic binder is heated above its melting point which causes the polymer to flow. This results in the thermoplastic polymer flowing into the cavities of the mold to form the article 10. The article is then cooled to solidify the thermoplastic binder. In the case of a thermosetting polymer, during molding the organic binder is in a thermoplastic state, i.e., after it is heated above its melting point it will flow into the cavities of the mold to form the article. The organic binder then crosslinks at ambient or elevated temperatures. Examples of suitable thermosetting polymers include styrene butadiene rubber, polyurethane, urea-formaldehyde, epoxy, and phenolics.

Thermoplastic Polymers

The article according to the present invention may comprise a thermoplastic polymer. Examples of suitable thermoplastic polymers include polycarbonate, polyetherimide, polyester, polyethylene, polysulfone, polystyrene, polybutylene, acrylonitrile-butadiene-styrene block copolymer, polypropylene, acetal polymers, polyurethanes, polyamides, and combinations thereof. In general, preferred thermoplastic polymers of the invention are those having a high melting temperature and good heat resistance properties. Thermoplastic polymers may be preferably employed for low speed applications of article 10, in which stress during operation is relatively low. Examples of commercially available thermoplastic polymers suitable for use with the present invention include GRILON CR9 copolymer of NYLON 6,12 available from EMS-American Grilon, Inc., Sumter, South Carolina.

One particular thermoplastic polymer suitable for use with the present invention is a polyamide resin material, which is characterized by having an amide group, i.e., —C(O)NH—. Various types of polyamide resin materials, i.e., NYLONS can be used, such as NYLON 6/6 or NYLON 6. NYLON 6/6 is a condensation product of adipic acid and hexamethylenediamine. NYLON 6/6 has a melting point of about 264° C. and a tensile strength of about 770 kg/cm2. NYLON 6 is a polymer of ε-caprolactam. NYLON 6 has a melting point of about 220° C. and a tensile strength of about 700 kg/cm2. Examples of commercially available NYLON resins useable as backings in articles according to the present invention include "VYDYNE" from Ascend Performance Materials, Houston, TX "ZYTEL" and "MINION" both from Du Pont, Wilmington, Del. "TROGANMID" from Evonik, Allentown, PA, and "ULTRAMID" from BASF Corp., Parsippany, N.J.

Thermoplastic Elastomers

In some instances, such as high speed, high stress applications, it is preferred that the moldable polymer is a thermoplastic elastomer or includes a thermoplastic elastomer. Thermoplastic elastomers (or "TPE" s) are defined and reviewed in Thermoplastic Elastomers, A Comprehensive Review, edited by N. R. Legge, G. Holden and H. E. Schroeder, Hanser Publishers, New York, 1987 (referred to herein as "Legge et al.", the entire disclosure of which is incorporated by reference herein). Thermoplastic elastomers (as used herein) are generally the reaction product of a low equivalent weight polyfinctional monomer and a high equivalent weight polyfunctional monomer, wherein the low equivalent weight polyfunctional monomer has a functionality of at most about 2 and equivalent weight of at most about 300 and is capable on polymerization of forming a hard segment (and, in conjunction with other hard segments, crystalline hard regions or domains) and the high equivalent weight polyfunctional monomer has a functionality of at least about 2 and an equivalent weight of at least about 350 and is capable on polymerization of producing soft, flexible chains connecting the hard regions or domains. "Thermoplastic elastomers" differ from "thermoplastics" and "elastomers" (a generic term for substances emulating natural rubber in that they stretch under tension, have a high tensile strength, retract rapidly, and substantially recover their original dimensions) in that thermoplastic elastomers, upon heating above the melting temperature of the hard regions, form a homogeneous melt which can be processed by thermoplastic techniques (unlike elastomers), such as injection molding, extrusion, blow molding, and the like. Subsequent cooling leads again to segregation of hard and soft regions resulting in a material having elastomeric properties, however, which does not occur with thermoplastics. Thermoplastic elastomers combine the proccessability (when molten) of thermoplastic materials with the functional performance and properties of conventional thermosetting rubbers (when in their non-molten state), and which are described in the art as ionomeric, segmented, or segmented ionomeric thermoplastic elastomers. The segmented versions comprise "hard segments" which associate to form crystalline hard domains connected together by "soft", long, flexible polymeric chains. The hard domain has a melting or disassociation temperature above the melting temperature of the soft polymeric chains.

Commercially available thermoplastic elastomers include segmented polyester thermoplastic elastomers, segmented polyurethane thermoplastic elastomers, segmented polyamide thermoplastic elastomers, blends of thermoplastic elastomers and thermoplastic polymers, and ionomeric thermoplastic elastomers.

"Segmented thermoplastic elastomer", as used herein, refers to the sub-class of thermoplastic elastomers which are based on polymers which are the reaction product of a high equivalent weight polyfunctional monomer and a low equivalent weight polyfunctional monomer. Segmented thermoplastic elastomers are preferably the condensation reaction product of a high equivalent weight polyfunctional monomer having an average functionality of at least 2 and an equivalent weight of at least about 350, and a low equivalent weight polyfunctional monomer having an average functionality of at least about 2 and an equivalent weight of less than about 300. The high equivalent weight polyfunctional monomer is capable on polymerization of forming a soft segment, and the low equivalent weight polyfunctional monomer is capable on polymerization of forming a hard segment. Segmented thermoplastic elastomers useful in the present invention include polyester TPEs, polyurethane TPEs, and polyamide TPEs, and silicone elastomer/polyimide block copolymeric TPEs, with the low and high equivalent weight polyfunctional monomers selected appropriately to produce the respective TPE.

The segmented TPEs preferably include "chain extenders", low molecular weight (typically having an equivalent weight less than 300) compounds having from about 2 to 8 active hydrogen functionality, and which are known in the TPE art. Particularly preferred examples include ethylene diamine and 1,4-butanediol.

"Ionomeric thermoplastic elastomers" refers to a subclass of thermoplastic elastomers based on ionic polymers (ionomers). Ionomeric thermoplastic elastomers are composed of two or more flexible polymeric chains bound together at a plurality of positions by ionic associations or clusters. The ionomers are typically prepared by copolymerization of a functionalized monomer with an olefinic unsaturated monomer, or direct functionalization of a preformed polymer. Carboxyl-functionalized ionomers are obtained by direct copolymerization of acrylic or methacrylic acid with ethylene, styrene and similar comonomers by free-radical copolymerization. The resulting copolymer is generally available as the free acid, which can be neutralized to the degree desired with metal hydroxides, metal acetates, and similar salts. A review of ionomer history and patents concerning same is provided in Legge et al., pp. 231-243.

"Thermoplastic polymer", or "TP" as used herein, has a more limiting definition than the general definition, which is "a material which softens and flows upon application of pressure and heat." It will of course be realized that TPEs meet the general definition of TP, since TPEs will also flow upon application of pressure and heat. It is thus necessary to be more specific in the definition of "thermoplastic" for the purposes of this invention. "Thermoplastic" as used herein, means a material which flows upon application of pressure and heat, but which does not possess the elastic properties of an elastomer when below its melting temperature.

Blends of TPE and TP materials are also within the invention, allowing even greater flexibility in tailoring mechanical properties of the abrasive filaments of the invention.

Commercially available and preferred segmented polyesters include those known under the trade designations "HYTREL 4056", "HYTREL 5526", "HYTREL 5556", "HYTREL 6356", "HYTREL 7246", and "HYTREL 8238" available from E.I. Du Pont de Nemours and Company, Inc., Wilmington, Del., with the most preferred including HYTREL 5526, HYTREL 5556, and HYTREL 6356. A similar family of thermoplastic polyesters is available under the tradename "RITEFLEX" (Hoechst Celanese Corporation). Still further useful polyester TPEs are those known under the trade designations "ECDEL" from Eastman Chemical Products, Inc., Kingsport, Tenn. "ARNITEL" from DSM Engineered Plastics; and "BEXLOY" from Du Pont. Further useful polyester TPEs include those available as "LUBRICOMP" from SABIC, Exton, Pa., and is commercially available incorporating lubricant, glass fiber reinforcement, and carbon fiber reinforcement.

Commercially available segmented polyamides include those known under the trade designation "PEBAX" and "RILSAN" both available from Arkema, King of Prussia, PA.

Commercially available segmented polyurethanes include those known under the trade designation "ESTANE", available from Lubrizol, Brecksville, Ohio. Other segmented polyurethanes include those known under the trade designations "PELLETHANE", and "ISOPLAST" from The Dow Corning Company, Midland, Mich.; and those known under the trade designation "ELASTOLLAN" from BASF Corporation.

Thermoplastic elastomers are further described in U.S. Pat. No. 5,427,595 (Pihl et al.), and assigned to the assignee of the present application, the entire disclosure of which is incorporated herein by reference.

EXAMPLES

Objects and advantages of this disclosure are further illustrated by the following non-limiting examples, but the particular materials and amounts thereof recited in these examples, as well as other conditions and details, should not be construed to unduly limit this disclosure. Unless otherwise noted, all parts, percentages, ratios, etc. in the Examples and the rest of the specification are by weight.

Unless stated otherwise, all other reagents were obtained, or are available from fine chemical vendors such as Sigma-Aldrich Company, St. Louis, Missouri, or may be synthesized by known methods.

Unit Abbreviations Used in the Examples cm: centimeter
mm: millimeter

Abrasive Particles Used in the Examples

TABLE 1

| ABBREVIATION | DESCRIPTION |
| --- | --- |
| AP1 | standard, random crushed alpha alumina abrasive grains available under trade designation 321 CUBITRON from 3M Company, St. Paul, Minnesota that were graded to ANSI size 80 grit |
| AP2 | Formed abrasive particles were prepared according to the description "Preparation of Formed Abrasive Particles" below |

Preparation of Formed Abrasive Particles

Formed abrasive particles were prepared according to the disclosure of U.S. Pat. No. 8,142,531 (Adefris et al.). The formed abrasive particles were prepared by molding alumina sol gel in equilateral triangle-shaped polypropylene mold cavities of 0.25-millimeter depth and 1.001 millimeters on each side. The draft angle between the sidewall and bottom of the mold was 98 degrees. The particles were then treated as described in the disclosure of U.S. Pat. No. 5,213,591 (Celikkaya et al.). The formed abrasive particles made as described above are used, for example, in 3M 987C CUBITRON II 80+ grade abrasive discs available from 3M Company, St. Paul, Minnesota, USA.

Example 1 and Comparative A

Example 1

All percentages provided in the formulation are by weight.
The formulation used was 48.0% polyester-based thermoplastic elastomer obtained under the trade designation "HYTREL 6356" (from E.I. Dupont de Nemours and Company, Inc., Wilmington, Delaware), 12.0% lubricant obtained under the trade designation "MB50-010" (from Dow Corning Company, Midland, Michigan), 10.0% Clariant Color NE1464234 Yellow (from Clariant International, Ltd, Charlotte, North Carolina), and 30.0% AP2. Six abrasive brushes were made from the formulation using injection molding method using standard run conditions. The injection molding techniques are known in the art. The formulation cited was introduced into a Toyo Plastar TM300H Injection Molding machine and brought to a melt temperature of roughly 230 degrees Celsius and injected into a single cavity mold with a mold temperature of 43 degrees Celsius to form a single abrasive disc. The disc weight was 39.8 grams. The base of the abrasive disc had a diameter of 14 cm, and a thickness of 1.78 mm. The abrasive disc, had 216 integrally molded bristles. Each bristle was 32 mm long and tapered from 1.65 mm wide at the root to 1.20 mm wide from root to tip with a constant thickness of 0.89 mm. Fourteen discs were mounted together to form an abrasive brush.

Comparative Example A

Comparative Example A was prepared generally by the method described in Example 1 with the exception that 30% abrasive particle AP1 was used instead of 30% AP2.
Performance Test
Brushes made from Example 1 and Comparative Example A were tested by rotating the brushes at 1750 revolutions per minute (rpm) and urging a 5.08 cm (2 inches) wide, 27.9 cm (11 inch) long and 0.144 cm (0.057 inch) thick sheet of 1018 Cold Roll Steel against the rotating wheel with a force of 22.2 Newtons (5 lbf). The substrate was moved with a linear speed of 7.62 cm (3 inches) per second back and forth along a travel length of 15.24 cm (6 inches). Contact between the substrate and the brush was maintained for 30 seconds and then removed from contact for 10 second; this constituted one cycle. One run consisted of 10 consecutive cycles. The substrates were weighed before and after a run to measure the cut. The brushes were weighed before and after a run to measure the wear. A relative measure of efficiency, the G-ratio, was calculated by dividing the cut by the wear. For each brush sample, 3 sequential runs were performed. The values for cut, wear, and G-ratio data of each run for each sample are shown in Table 2.

TABLE 2

| Example | Cut in grams | Wear in grams | G-ratio |
|---|---|---|---|
| Example 1 Run 1 | 12.51 | 0.05 | 250.2 |
| Example 1 Run 2 | 11.64 | 0.09 | 129.3 |

TABLE 2-continued

| Example | Cut in grams | Wear in grams | G-ratio |
|---|---|---|---|
| Example 1 Run 3 | 9.89 | 0.12 | 82.4 |
| Comparative Example A Run 1 | 3.15 | 0.05 | 63.0 |
| Comparative Example A Run 2 | 3.16 | 0.09 | 35.1 |
| Comparative Example A Run 3 | 2.99 | 0.07 | 42.7 |

The surface finish on a substrate was also measured from the brushes made from Example 1 and Comparative Example A. The substrate was a 16-gauge 1018 carbon steel plate. Each brush was urged for ten downstrokes at a 7.62 cm (3 inches) per second feed rate with a force of 22.24 Newtons (5 pound-force) against a wheel running at 1750 revolutions per minute (rpm). The surface finish was measured with a Hommel-Etamic Waveline 120 profilometer controlled by TurboWave v7.55 software using a $\lambda_c$ of 0.08 cm (0.030 inch) and Gaussian filter per ISO 11562. Five consecutive traces were made across the scratch lay on the workpiece. Results for mean Ra and Rz are shown in Table 3.

TABLE 3

| Example | Ra | Rz |
|---|---|---|
| Example 1 | 0.57 micron (22.4 microinches) | 4.65 micron (183 microinches) |
| Comparative Example A | 0.48 micron (18.9 microinches) | 3.86 micron (152 microinches) |

Particle Orientation Analysis
For a sample made from Example 1, a specimen for scanning was obtained by sectioning an individual elongate abrasive element and affixing to a polystyrene plaque using Duco™ cement (Devcon, Danvers, MA). The prepared specimen was placed in a 6 millimeter inner diameter polymeric tube with the long axis of the elongate abrasive element parallel to the long axis of the polymeric tube. The polymeric tube containing the specimen was placed on a brass holder that allowed the polymeric tube to be mounted onto the rotary stage of the scanning instrument.

X-ray microtomography data were obtained by use of a Skyscan 2211 (Bruker microCT, Kontich, Belgium) X-ray microtomography scanner at a resolution of 5 um. Data were collected using X-ray source settings of 70 kV and 300 uA with the energy distribution of the incident beam modified by application of a 0.5 mm aluminum filter. Projected X-ray images were recorded on a flat panel detector at discrete sample rotation angles as the sample was rotated through a 360 degree angular range using a 0.10 degree angular step size. Five individual detector frames were averaged per collected projected image. Reconstruction was conducted using computer program NRecon (v 1.6.10, Bruker microCT, Kontich, Belgium) where corrections for X-ray source centering, detector ring artifacts, and beam hardening were employed.

Reconstructed 2D slice images were subjected to post processing to isolate the location of formed abrasive particles within the scanned specimen. A 2D slice image gray scale threshold permitted isolation of formed abrasive grain from higher and lower density material in the elongate abrasive element construction. Subsequent size filtering removed fragments and small non-formed abrasive grains from the images. The resulting 2D gray scale images were saved as a separate data set for subsequent examination of formed abrasive grain orientation. Computer program CT Analyzer (v 1.16.4, Bruker microCT, Kontich, Belgium) was used for processing of reconstructed data.

The segmented stack of reconstructed 2D slice images were processed using computer program Blob3D (R A. Ketchum Computational methods for quantitative analysis of three-dimensional features in geological specimens. Geosphere, 1, 32-41 (2005); URL: http://www.ctlab.geo.utexas.edu/software/blob3d/). The 3D volume of each formed abrasive grain was fitted by an appropriately sized ellipsoid. The program calculated the center of mass of each resulting best-fit ellipsoid to provide the physical locations of each formed abrasive grain in the processed data set. The minimum (short) and maximum (long) axes of the best-fit ellipsoid fit to each formed abrasive grain were identified. The orientation of the minimum and maximum axes of the best-fit ellipsoid was calculated and reported as the of the x-axis, y-axis, and z-axis direction cosines.

Orientation angles, initially in radians, were calculated by taking the inverse cosines of the z-direction cosines as determined above. The orientation angles were then converted from radians to degrees. The angles so calculated are present below in Table 4.

TABLE 4

Angle Between Particle Plane and Element Axis

| Particle # | Angle (Degrees) |
|---|---|
| 1 | 23.2 |
| 2 | 36.8 |
| 3 | 4.1 |
| 4 | 4.4 |
| 5 | 5.4 |
| 6 | 3.2 |
| 7 | 1.1 |
| 8 | 17.6 |
| 9 | 16.8 |
| 10 | 15.9 |
| 11 | 0.8 |
| 12 | 1.2 |
| 13 | 25.0 |
| 14 | 4.7 |
| 15 | 0.6 |
| 16 | 5.8 |
| 17 | 22.2 |
| 18 | 45.7 |
| 19 | 4.4 |
| 20 | 73.8 |
| 21 | 3.9 |
| 22 | 7.6 |
| 23 | 7.1 |
| 24 | 3.3 |
| 25 | 4.4 |
| 26 | 2.5 |
| 27 | 35.6 |
| 28 | 1.9 |
| 29 | 26.7 |
| 30 | 5.3 |
| 31 | 4.1 |
| 32 | 30.5 |
| 33 | 1.9 |
| 34 | 21.1 |
| 35 | 41.1 |
| 36 | 5.5 |
| 37 | 3.5 |
| 38 | 3.6 |
| 39 | 21.3 |

TABLE 4-continued

Angle Between Particle Plane and Element Axis

| Particle # | Angle (Degrees) |
|---|---|
| 40 | 35.3 |
| 41 | 5.4 |
| 42 | 44.9 |
| 43 | 7.1 |
| 44 | 13.3 |
| 45 | 5.8 |
| 46 | 1.1 |
| 47 | 5.7 |
| 48 | 2.4 |
| 49 | 1.6 |
| 50 | 7.3 |
| 51 | 1.6 |
| 52 | 1.8 |
| 53 | 4.0 |
| 54 | 2.8 |
| 55 | 20.4 |
| 56 | 0.4 |
| 57 | 12.5 |
| 58 | 2.5 |
| 59 | 35.1 |
| 60 | 4.1 |
| 61 | 0.2 |
| 62 | 52.3 |
| 63 | 0.3 |
| 64 | 63.0 |

The particles (and their respective orientation angles) are presented in Table 5 below in 5 degree "bins" (e.g., all particles having an orientation angle of less than 5 degrees are placed into the bin "<5" degrees from parallel to the element axis, and so on), and the number and cumulative percentage of particles in each bin are depicted.

TABLE 5

| Degrees from Parallel | Number of Particles | Cumulative % of Particles |
|---|---|---|
| <5 | 30 | 46.9% |
| 5-<10 | 11 | 64.1% |
| 10-<15 | 2 | 67.2% |
| 15-<20 | 3 | 71.9% |
| 20-<25 | 5 | 79.7% |
| 25-<30 | 2 | 82.8% |
| 30-<35 | 1 | 84.4% |
| 35-<40 | 4 | 90.6% |
| 40-<45 | 2 | 93.8% |
| 45-<50 | 1 | 95.3% |
| 50-<55 | 1 | 96.9% |
| 55-<60 | 0 | 96.9% |
| 60-<65 | 1 | 98.4% |
| 65-<70 | 0 | 98.4% |
| 70-<75 | 1 | 100.0% |
| 75-<80 | 0 | 100.0% |
| 80-<85 | 0 | 100.0% |
| 85-<90 | 0 | 100.0% |

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. An abrasive article comprising at least one primary elongate abrasive element extending along an element axis, the primary elongate abrasive element comprising a plurality of formed abrasive particles retained in an organic binder that is a thermoplastic polymer, a thermoplastic elastomer, or a combination thereof and comprises no thermoset polymer, wherein the plurality of formed abrasive particles each comprise:
a maximum dimension M;
a thickness T measured perpendicularly to the maximum dimension M;
a particle axis defined along the maximum dimension M; and
a particle plane containing the particle axis and perpendicular to the thickness T;
wherein at least 50% of the formed abrasive particles are orientationally aligned along the element axis, wherein the orientationally aligned formed abrasive particles comprise first and second major faces separated by the thickness T, wherein the particle axis is defined along one of the first major face or the second major face, and the particle plane is substantially parallel to the first and second major faces, and wherein the formed abrasive particles that are orientationally aligned are generally orientationally aligned such that the particle plane is oriented within 60 degrees of parallel to the element axis.

2. The abrasive article of claim 1, wherein at least 66% of the formed abrasive particles are generally orientationally aligned.

3. The abrasive article of claim 1, wherein at least a portion of the formed abrasive particles that are orientationally aligned are precisely orientationally aligned such that the particle plane is oriented within 15 degrees of parallel to the element axis.

4. The abrasive article of claim 3, wherein at least 66% of the formed abrasive particles are precisely orientationally aligned.

5. The abrasive article of claim 1, comprising a branch elongate abrasive element extending from the primary elongate abrasive element.

6. The abrasive article of claim 1, wherein the primary elongate abrasive element extends from a base.

7. The abrasive article of claim 1, wherein the organic binder comprises at least one of a polycarbonate, polyetherimide, polyester, polyethylene, polysulfone, polystyrene, polybutylene, acrylonitrile-butadiene-styrene block copolymer, polypropylene, acetal polymer, polyurethane, polyamide, or a thermoplastic elastomer.

8. An abrasive article comprising at least one primary elongate abrasive element extending along an element axis, the primary elongate abrasive element comprising a plurality of formed abrasive particles retained in an organic binder that is a thermoplastic polymer, a thermoplastic elastomer, or a combination thereof and comprises no thermoset polymer, wherein the plurality of formed abrasive particles each comprise:
a maximum dimension M;
a thickness T measured perpendicularly to the maximum dimension M;
a particle axis defined along the maximum dimension M; and
a particle plane containing the particle axis and perpendicular to the thickness T, wherein at least 50% of the formed abrasive particles are orientationally aligned along the element axis, wherein the formed abrasive particles that are orientationally aligned are generally orientationally aligned such that the particle plane is oriented within 60 degrees of parallel to the element axis, and wherein a ratio R of the maximum dimension M to the thickness T of the orientationally aligned formed abrasive particles is 3 or greater.

9. The abrasive article of claim 8, comprising a branch elongate abrasive element extending from the primary elongate abrasive element.

10. The abrasive article of claim 8, wherein the primary elongate abrasive element extends from a base.

11. The abrasive article of claim 8, wherein the organic binder comprises at least one of a polycarbonate, polyetherimide, polyester, polyethylene, polysulfone, polystyrene, polybutylene, acrylonitrile-butadiene-styrene block copolymer, polypropylene, acetal polymer, polyurethane, polyamide, or a thermoplastic elastomer.

12. The abrasive article of claim 1, wherein each primary elongate abrasive element is formed by flowing a mixture of the organic binder and the formed abrasive particles along the element axis.

13. A method of forming the elongate abrasive element of claim 8, the method comprising
flowing a mixture of the organic binder and the plurality of formed abrasive particles along a flow axis such that at least 50% of the plurality of formed abrasive particles orientationally align along the flow axis; and
allowing the mixture to set, thereby forming the elongate abrasive element comprising an element axis, wherein at least 50% of the plurality of formed abrasive particles are orientationally aligned along the element axis, and wherein orientationally aligning the formed abrasive particles results in generally orientationally aligning the formed abrasive particles such that the particle plane is oriented within 60 degrees of parallel to the element axis.

14. The method of claim 13, wherein at least a portion of the formed abrasive particles that are orientationally aligned are precisely orientationally aligned such that the particle plane is oriented within 15 degrees of parallel to the element axis.

15. The method of claim 13, wherein flowing the mixture comprises injection molding the mixture into a mold cavity comprising a shape corresponding to the elongate abrasive element.

16. The method of claim 13, wherein flowing the mixture comprises extruding the mixture from a die opening.

17. The method of claim 13, wherein prior to flowing the mixture, the organic binder is heated to a molten state, and wherein allowing the mixture to set comprises cooling the organic binder until it reaches a solidified state to retain the plurality of formed abrasive particles.

18. The abrasive article of claim 8, wherein at least 66% of the formed abrasive particles are generally orientationally aligned.

19. The abrasive article of claim 8, wherein at least a portion of the formed abrasive particles that are orientationally aligned are precisely orientationally aligned such that the particle plane is oriented within 15 degrees of parallel to the element axis.

20. The abrasive article of claim 19, wherein at least 66% of the formed abrasive particles are precisely orientationally aligned.

* * * * *